(12) United States Patent
Bader

(10) Patent No.: US 8,197,696 B1
(45) Date of Patent: Jun. 12, 2012

(54) METHODS TO CONTROL THE PRECIPITATION OF INORGANIC MATERIALS AND/OR TO SCRUB FLUE GAS

(76) Inventor: Mansour S. Bader, College Station, TX (US)

( * ) Notice: Subject to any disclaimer, the term of this patent is extended or adjusted under 35 U.S.C. 154(b) by 431 days.

(21) Appl. No.: 12/592,801

(22) Filed: Dec. 3, 2009

(51) Int. Cl.
  *C02F 1/66* (2006.01)
  *B01D 37/00* (2006.01)
  *C02F 1/00* (2006.01)

(52) U.S. Cl. ........ 210/729; 210/710; 210/711; 210/712; 210/702; 210/639; 210/650; 210/749; 210/768

(58) Field of Classification Search .................. None
  See application file for complete search history.

(56) References Cited

U.S. PATENT DOCUMENTS

| | | | | |
|---|---|---|---|---|
| 5,422,009 A | * | 6/1995 | Hoang et al. | 210/669 |
| 5,468,394 A | | 11/1995 | Bader | |
| 5,587,088 A | * | 12/1996 | Bader | 210/729 |
| 6,365,051 B1 | * | 4/2002 | Bader | 210/640 |
| 6,663,778 B1 | * | 12/2003 | Bader | 210/640 |
| 7,392,848 B1 | | 7/2008 | Bader | |

* cited by examiner

*Primary Examiner* — Krishnan S Menon

(57) ABSTRACT

Methods are disclosed for the precipitation of magnesium hydroxide in a standalone basis or in conjunction with the precipitation of calcium in different forms from saline streams. Methods are also disclosed for flue gas scrubbing in conjunction with the precipitation methods or in a standalone basis. Among the benefits of the disclosed methods is that their resulted spent saline stream and/or gas can be used, for instance, to feed seawater desalination plants and/or to enhance hydrocarbons recovery.

36 Claims, 15 Drawing Sheets

METHODS TO CONTROL THE PRECIPITATION OF INORGANIC MATERIALS AND/OR TO SCRUB FLUE GAS

BACKGROUND OF THE INVENTION

Precipitation of Magnesium Hydroxide

Magnesium hydroxide, $Mg(OH)_2$, is an important inorganic material in manufacturing, for instance, flame retardants, refractory, ceramics, composites, catalysts, absorbents, additives, electronics, fillers and insulators. The precipitation of highly pure $Mg(OH)_2$ in submicron sizes with special morphologies (needle-, lamellar-, and rod-like) is of a prime interest due to their large anisotropy and perfect crystalline. However, the precipitation of such morphologies in a commercial scale is a challenge since they may adopt various shapes, which in turn, play critical roles in determining their intrinsic properties (agglomeration level, surface area, size, and size distribution).

The production of $Mg(OH)_2$ is dominantly driven by two methods. The first method is based on precipitating $Mg(OH)_2$ using an alkaline base from saline streams such as seawater and the like or from an aqueous stream that contains a dissolved magnesium salt. The second method is based on hydrating magnesium oxide (MgO).

Seawater is one the main sources for commercial production of $Mg(OH)_2$. Dolomite, $CaMg(CO_3)_2$, is typically used as a source for the alkaline base by calcining it at high temperatures to produce a mixture of calcium and magnesium oxides (dolime) and carbon dioxide:

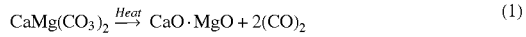

$$CaMg(CO_3)_2 \xrightarrow{Heat} CaO \cdot MgO + 2(CO)_2 \quad (1)$$

The dolime is then added to seawater (or any potential magnesium-rich saline stream) in which the dolime undergoes hydration to generate $Ca(OH)_2$ and $Mg(OH)_2$. $Ca(OH)_2$, as an alkaline base, would precipitate the dissolved magnesium ion in seawater:

$$Ca(OH)_2 + Mg \rightarrow Mg(OH)_2 + Ca \quad (2)$$

The merits of this approach are: (1) raw materials are abundant; and (2) the magnesium portion in the dolime provides an additional magnesium source.

However, there are several demerits for this approach. First, the calcination of $CaMg(CO_3)_2$ to produce dolime takes place at high temperatures and thus it is energy intensive. In addition, it produces flue gas.

Second, when seawater is mixed with dolime, some of CaO remains unchanged (not hydrated) and recovered with $Mg(OH)_2$ precipitates as an undesirable impurity. In addition, the raw materials contain further undesirable impurities (e.g., silica and metal oxides from $CaMg(CO_3)_2$ as well as boron from seawater (or other saline streams) that prevent the production of high quality $Mg(OH)_2$ or limit the applications of low quality $Mg(OH)_2$. Since $Mg(OH)_2$ could be used to produce, for instance, refractory or flame retardant materials at elevated temperatures, impurities such as CaO along with iron, manganese, aluminum and silica tend to form low melting oxides that affect the properties and the strength of the produced materials. Boron tends to increase the solubility of dicalcium silicate in the melt, which would contribute to lowering the strength of the produced materials. As such, natural minerals such as $CaMg(CO_3)_2$ may not be the most suitable materials to produce high purity $Mg(OH)_2$.

Third, $Mg(OH)_2$ is typically produced as macro size precipitates, which are prone to gravity-driven sedimentation. In the absence of stabilizing agents (e.g., dispersants) and/or improper design of precipitation vessels, however, such precipitates undergo rapid agglomeration (gel-like). Gel-like precipitates are difficult to process using conventional sedimentation and filtration equipment. In addition, the morphology of the final product will be inherited from its $Mg(OH)_2$ precursor.

Fourth, copious amounts of seawater are needed to produce commercial amounts of $Mg(OH)_2$. For instance, the production of one ton of $Mg(OH)_2$ requires the processing of about 300 tons of seawater using $CaMg(CO_3)_2$. In addition, the concentration of calcium (Eq. 2) in the spent seawater could be at least 4-times higher than its concentration in seawater, which would pair with sulfate to produce saturated gypsum. This creates ecological problems since the spent seawater that contains finely suspended $Mg(OH)_2$ precipitates (not captured by conventional filters) along with gypsum precipitates is released back to the sea.

Developing a controlled precipitation method for $Mg(OH)_2$ that overcomes the demerits of existing methods is one of the aspects of this invention. $Mg(OH)_2$ precipitates in submicron sizes possess high surface areas, many pores, and desirable surface defects such as vacant cation-anion sites and/or reactive acid-base sites. The development of such precipitates as stoichiometric reagents for advanced applications is of vital interest.

Alkaline-Sulfate Scale in Seawater Desalination Plants

Alkaline scale in seawater desalination plants is controlled in the seawater pre-treatment step by acidification. The pH of seawater is typically lowered to about 4 by acid treatment (e.g., sulfuric acid) to convert bicarbonate into carbon dioxide ($CO_2$). $CO_2$ would then be stripped off by a vacuum de-aerator or an atmospheric stripping tower. However, the pH of the de-carbonated seawater must be re-adjusted (7-8) by adding a caustic solution to prevent corrosion problems in downstream equipment. If the acidification step is insufficient (e.g., the pH value is about 5 or slightly higher), then the remaining bicarbonate would thermally breakdown in seawater pre-heaters to produce hydroxide ions and $CO_2$. The release of hydroxide ions would increase the pH to greater than 8, which would trigger a partial precipitation of $Mg(OH)_2$. The release of $CO_2$ as a non-condensable gas would create venting problems in downstream evaporators.

Sulfate scale in seawater desalination plants is mainly controlled by operating the plant below or about the saturation limit of calcium sulfate. That's why the overall recovery of any thermal-driven seawater desalination method such as Multi-Stage Flash (MSF) or Multi-Effect Distillation (MED) is about 10%. Thus, the volumes of their brine (waste) streams are about 90% of feed streams. The magnitude of such low potable water production is reflected, for instance, in the most recent installation of MSF plant in the Arabian Gulf region in which about 12 million gallons per day (GPD) of potable water is produced from about 120 million GPD of seawater. Such an extremely low water recover is mainly attributed to the extreme calcium sulfate scale boundary.

FIG. 1, for example, shows the aqueous solubility limits of the three principal hydrates of calcium sulfate in seawater from the Arabian Gulf as a function of temperatures and concentration factors. FIG. 1 reveals the approximate super-saturation envelope of such hydrates; the key critical obstacle in desalting seawater that causes enormous engineering difficulties, hinders the production of low cost water, and directly controls the recovery ratio of any seawater desalting plant regardless of the employed technology. At the operating temperatures range of MSF or MED (80-110° C.), the possible forms of calcium sulfate are anhydrite ($CaSO_4$) and/or hemihydrate ($CaSO_4.0.5H_2O$). The solubility limits of such hydrates are steeply and inversely proportional with temperatures.

The overall recovery of pressure-driven seawater desalination methods such as Reverse Osmosis (RO) in treating seawater from the Arabian Gulf, for instance, is at best 30%. As such, the volume of the brine stream is at least 70% of the feed stream. The main reason for a better recovery from RO relative to MSF or MED is that RO is operated at ambient temperatures, and thus calcium sulfate is in the form of gypsum ($CaSO_4.2H_2O$). FIG. 1 shows that the saturation limit of gypsum is appreciably higher than the saturation limits of anhydrite or hemihydrate and slightly increases with increasing seawater concentration factors, which should allow a higher RO recovery. However, RO concentration polarization forces a significant buildup of gypsum at the membrane surface to reach higher concentrations than its concentration in seawater feed stream, along with the increase of seawater osmotic pressures as concentration factors increase preclude RO from reaching higher recovery ratios.

Regardless of seawater desalting methods, the volumes of brine streams remain significant (70-90% of seawater feed stream). The discharge of such brine streams to the sea could increase the salinity around the seawater intake lines, particularly when the dispersion of such streams is not fast enough (e.g., not enough natural current at the disposal site, relatively shallow water, and absence of mechanical dispersion devices). In addition, the lack of oxygen in such streams combined with higher salinity, higher temperature, residues of deoxygenating chemicals (e.g. sodium metabisulfate) and concentrated toxic species (e.g., derivatives of boron and chlorine) would adversely affect the marine environment. Furthermore, the near induction precipitation of gypsum at discharge temperatures (40-55° C.) would create a cloud of turbid precipitates once it's discharged back to sea (due to salinity differences between seawater and brine streams) that poisons the marine habitat.

The implementation of a very expensive new generation of hybrid seawater desalination plants is currently taking place to presumably solve the current and future water-power demands at lower costs by providing a better match between water and power loads. Although the implementations of well optimized hybrid plants are a must, they remain limited because they do not resolve the obvious sulfate scale obstacle. However, sulfate by itself is not the issue in seawater desalination, but rather it is pairing with calcium to form sparingly soluble hydrates is the problem.

If an effective and inexpensive technology is integrated with seawater desalination plants to nearly completely deplete the calcium ion or the paired calcium and sulfate ions, then seawater desalination plants can be efficiently operated without any sulfate scale impairment. For instance, thermal driven seawater desalination plants such as MSF can be operated to their maximum designed "top brine" temperatures (140-150° C.), instead of their current operational temperatures (90-110° C.) that is forcibly imposed by the calcium sulfate scale envelope (FIG. 1). By effectively lifting the pre-imposed sulfate scale design limitation on the maximum potable water production, the production of potable water could be increased by about 7-folds. In addition, it entirely eliminates the sulfate scale related maintenance costs within the desalination equipment. Furthermore, it relieves concerned countries from allocating a significant portion of their budgets to build new seawater desalination plants at sky rocketing costs.

Developing controlled precipitation methods for $Mg(OH)_2$ along with calcium in the form of either hydroxide or carbonate or sulfate in a standalone basis or conjunction with seawater desalination plants are further aspects of this invention.

Flue Gas in Power-Seawater Desalination Plants and the Like

Most power-seawater desalination co-plants in the Arabian Gulf, for example, are fueled by heavy oil. The use of heavy oil in such plants is attributed to the abundant reserves of heavy oil in that region and its lower commercial value compared to light oil. However, the sulfur content in heavy oil is relatively high (3-8% by weight). As a result, the particular emission of sulfur dioxide ($SO_2$) from such plants is of a prime concern. Table 1, for example, presents the average composition of heavy oil used in such co-plants. Assuming combustion to be complete with a 20% excess of air, the approximate composition of flue gas is presented in Table 2.

Power-seawater desalination co-plants in the Arabian Gulf region are among the chief sources of flue gas emission. The vast majority of such plants are not equipped with flue gas abatement systems. It's also the practice in some plants to allow turbines to exhaust directly to atmosphere (by-passing dampers and stacks) for the purpose of slightly increasing turbines outputs. Due to health and environmental issues along with the potential tax (e.g., $25 per ton) that could be imposed on flue gas emission, a new direction in treating rather than freely emitting flue gas will be enforced.

The use of seawater in a once-through basis to scrub $SO_2$ and covert it to sulfite relies on the appreciable aqueous limit of $SO_2$ and the natural alkalinity of seawater to nearly neutralize the pH of the spent seawater. However, as are the cases in the standalone production of $Mg(OH)_2$ or potable water from seawater, considerable amounts of seawater are needed for $SO_2$ scrubbing. In addition, the spent seawater is richer with sulfite than seawater and thus it's depleted of oxygen. As such, the spent seawater requires: (1) aeration to convert sulfite to sulfate and thus re-adjust the oxygen content; and (2) dilution with further significant amounts of seawater to insure pH neutrality and minimize gypsum precipitation.

Flue gas desulfurization ($SO_2$) and sequestration ($CO_2$) can also be achieved by minerals absorption. $Mg(OH)_2$ and $Ca(OH)_2$ as scrubbing agents are of considerable interests since they possess high chemical reactivity due to their high surface areas. The reaction of $Mg(OH)_2$ with flue gas at its exhaust's temperature (150° C. or 422K) and after pre-oxidation of NO to $NO_2$ (the ratio of $SO_2$ to $NO_2$ should be greater than 5), takes place as follows:

$$CO_2 + Mg(OH)_2 \rightarrow MgCO_3 + H_2O \quad (3)$$

$$SO_2 + Mg(OH)_2 \rightarrow MgSO_3 + H_2O \quad (4)$$

$$SO_2 + MgSO_3 + H_2O \rightarrow Mg(HSO_3)_2 \quad (5)$$

$$NO_2 + 2MgSO_3 \rightarrow 2MgSO_4 + \tfrac{1}{2}N_2 \quad (6)$$

At 150° C., $MgCO_3$ (Eq. 3) is readily thermally broken down:

$$MgCO_3 \rightarrow MgO + CO_2 \uparrow \quad (7)$$

MgO (Eq. 7) can be hydrated to $Mg(OH)_2$ and the near pure $CO_2$ can be used, for instance, as a supercritical fluid to enhance heavy oil recovery. The soluble magnesium salts (Eqs. 4-6) can also be regenerated to produce $Mg(OH)_2$ for reuse. As such, the reaction by-products are readily re-generable (MgO) and soluble (magnesium sulfite and sulfate), which are added advantages to the use of $Mg(OH)_2$ as a scrubbing agent.

Similarly, the reaction of $Ca(OH)_2$ with flue gas takes place as follows:

$$CO_2 + Ca(OH)_2 \rightarrow CaCO_3 + H_2O \qquad (8)$$

$$SO_2 + Ca(OH)_2 \rightarrow CaSO_3 + H_2O \qquad (9)$$

$$SO_2 + CaSO_3 + H_2O \rightarrow Ca(HSO_3)_2 \qquad (10)$$

$$NO_2 + 2CaSO_3 \rightarrow 2CaSO_4 + \tfrac{1}{2}N_2 \qquad (11)$$

At 150° C., $CaCO_3$ (Eq. 8) is also readily thermally broken down:

$$CaCO_3 \rightarrow CaO + CO_2 \uparrow \qquad (12)$$

and CaO (Eq. 12) can be hydrated to $Ca(OH)_2$. However, the major disadvantage of using $Ca(OH)_2$ as a flue gas scrubbing agent is the generation of the sparingly soluble calcium sulfate that requires a further treatment and/or an appropriate disposal path.

The scrubbing of $SO_2$ along with the controlled precipitation of $Mg(OH)_2$ and calcium in the form of either carbonate or sulfate in a standalone basis or in conjunction with seawater desalination plants are further aspects of this invention. The scrubbing of $SO_2$ in a standalone closed loop is also a further aspect of this invention. The simultaneous scrubbing of $SO_2$ and sequestering of $CO_2$ along with the sequential precipitation $Mg(OH)_2$ and $CaCO_3$ is also a further aspect of this invention. The simultaneous scrubbing of $SO_2$ and sequestering of $CO_2$ along with the precipitation $CaMg(CO_3)_2$ is also a further aspect of this invention.

Enhanced Oil Recovery

The common problems of the available standalone technologies that utilize seawater for the production of $Mg(OH)_2$ or for the production potable water or for the scrubbing of $SO_2$ are: (1) the generation of considerable amounts of spent seawater (waste stream); and (2) the generation of saturated gypsum in spent seawater. Oil-fields are possible sinks for such spent seawater since saline water injection is required to enhance oil recovery. However, oil-fields formation water is typically rich with alkaline cations (calcium, strontium, barium, and in some cases radium) in the form of chloride and depleted of sulfate. If spent seawater is used in oil-fields injection operations, such alkaline cations would pair with sulfate due to their low aqueous solubility limits. Spent seawater must thus be nearly completely de-sulfated for oil-fields injection operations.

The use of de-sulfated spent seawater, rather than the ongoing practice of injecting sulfate-rich seawater, would provide two valuable benefits. The first benefit is the protection of oil-fields by preventing: (1) sulfate scale deposits; (2) hydrogen sulfide generation; and (3) Naturally Occurring Radioactive Materials (NORM) from being generated downhole and brought to the surface via produced water. The second benefit is that oil-fields serve as appropriate sinks for spent seawater to protect the environment.

Emissions of flared flue gas from crude oil production operations are also enormous. Such flared flue gas can be scrubbed with $Mg(OH)_2$ (Eqs. 3-7) to liberate $CO_2$ in a near pure form. Heavy oil reservoirs are also appropriate sinks for the liberated $CO_2$ from the scrubbed flared flue gas (and/or from nearby seawater desalination plants) for recovery enhancement. Since oil-fields produced water is rich with calcium chloride, such water could also serve as a sink for $CO_2$ mineral sequestering to produce $CaCO_3$ (in addition to $Mg(OH)_2$ or $CaMg(CO_2)_2$.

SUMMARY OF THE INVENTION

In one aspect, the present invention provides a method for separating magnesium hydroxide from a saline stream or a magnesium-rich aqueous stream. The inventive method comprises the steps of: (a) converting the alkalinity of the saline stream to carbon dioxide by adding an acid or by absorbing sulfur dioxide as an acid gas to produce nearly alkalinity-free saline stream; and (b) removing magnesium hydroxide from the nearly alkalinity-free saline stream or from the magnesium-rich aqueous stream. The removal of magnesium hydroxide in step (b) is achieved by (i) injecting the nearly alkalinity-free saline stream or the magnesium-rich aqueous stream into a precipitator at a pressure between 30 psi and 1,100 psi through at least one nozzle; (ii) injecting an amine solvent into the precipitator at a pressure between 30 psi and the critical pressure of amine solvent through at least one nozzle to form precipitates comprising magnesium hydroxide; (iii) injecting a modifier for the amine solvent into the precipitator at pressure between 30 psi and 1,100 psi through at least one nozzle; (iv) removing precipitates from the nearly alkalinity-free saline stream or the magnesium-rich aqueous stream by filtering; (v) washing, filtering and drying of magnesium hydroxide precipitates; and (vi) removing at least most of the amine solvent from the nearly alkalinity-free saline stream or the magnesium-rich aqueous stream by a stripping unit.

Saline stream is seawater, brine from seawater desalination plants, concentrate saline water from evaporation ponds or solar ponds or salt-gradient solar ponds, natural brine, produced water, spent water from flue gas desulphurization, or a combination thereof. Magnesium-rich aqueous stream is an aqueous stream of magnesium chloride, magnesium sulfate, magnesium sulfite, magnesium nitrate, magnesium fluoride, magnesium bromide, magnesium iodide, magnesium bromate, magnesium chlorate, magnesium chlorite, magnesium chromate, or a combination thereof. The injection nozzle is premixed, coaxial, spray, vibrating, ultrasonic, or a combination thereof. The amine solvent is selected from the group consisting of isopropylamine, propylamine, dipropylamine, diisopropylamine, ethylamine, diethylamine, methylamine, dimethylamine, or a combination thereof. The modifier for the selected amine solvent is nitrogen, nitrous oxide, air or a combination thereof.

In another aspect, the present invention provides a method for separating magnesium hydroxide and calcium in hydroxide form or carbonate form or sulfate form from a saline stream to produce nearly magnesium-calcium free saline stream and inorganic materials. The inventive method comprises the steps of: (a) converting the alkalinity of the saline stream to carbon dioxide by adding an acid to produce nearly alkalinity-free saline stream; (b) removing magnesium hydroxide from the nearly alkalinity-free saline stream; (c) removing calcium in the hydroxide form from the magnesium-free saline stream; or (d) removing calcium in the carbonate form from the magnesium-free saline stream; or (e) removing calcium in the sulfate form from the magnesium-free saline stream. Magnesium hydroxide is removed from the nearly alkalinity-free saline stream in step (b) by (i) injecting the nearly alkalinity-free saline stream into a first precipitator at pressure between 30 psi and 1,100 psi through at least one nozzle; (ii) injecting an amine solvent into the first precipitator at pressure between 30 psi and the critical pressure of the amine solvent through at least one nozzle to form precipitates comprising magnesium hydroxide; (iii) injecting a modifier for the amine solvent into the first precipitator at pressure between 30 psi and 1,100 psi through at least one nozzle; (iv) removing precipitates from the nearly alkalinity-free saline stream by filtering to produce slurry of magnesium hydroxide and magnesium-free saline stream; and (v) washing, filtering and drying of the magnesium hydroxide slurry. Calcium in the hydroxide form is removed from the magnesium-free saline stream in step (c) by (i) injecting the magnesium-free saline stream into a second precipitator at pressure between 30 psi and 1,100 psi through at least one nozzle; (ii) injecting an amine solvent into the second precipitator at pressure between 30 psi and the critical pressure of the amine solvent through at least one nozzle to form precipitates comprising calcium hydroxide; (iii) injecting a modifier for the amine solvent into the second precipitator at pressure between 30 psi and 1,100 psi through at least one nozzle; (iv) removing precipitates from the magnesium-free saline stream by filtering to produce slurry of calcium hydroxide and nearly magnesium-calcium free saline stream; (v) washing, filtering and drying of the calcium hydroxide slurry; (vi) removing most of the amine solvent from the nearly magnesium-calcium free saline stream by stripping; and if desirable (vii) feeding the nearly magnesium-calcium free saline stream into desalination plants and auxiliary equipments. Calcium in the carbonate form is removed from the magnesium-free saline stream in step (d) by (i) injecting the magnesium-free saline stream into a second precipitator at pressure between 30 psi and 1,100 psi through at least one nozzle; (ii) injecting carbon dioxide into the second precipitator at pressure between 30 psi and 1,100 psi through at least one nozzle; (iii) injecting an amine solvent into the second precipitator at pressure between 30 psi and the critical pressure of the amine solvent through at least one nozzle to form precipitates comprising calcium carbonate; (iv) removing precipitates from the magnesium-free saline stream by filtering to produce slurry of calcium carbonate and nearly magnesium-calcium free saline stream; (v) washing, filtering and drying of the calcium carbonate slurry; (vi) removing most of the amine solvent from the nearly magnesium-calcium free saline stream by stripping; and if desirable (vii) feeding the nearly magnesium-calcium free saline stream into desalination plants and auxiliary equipments. Calcium in the sulfate form is removed from the magnesium-free saline stream in step (e) by (i) injecting the magnesium-free saline stream into a second precipitator at pressure between 30 psi and 1,100 psi through at least one nozzle; (ii) injecting calcium chloride rich formation water into the second precipitator at pressure between 30 psi and 1,100 psi through at least one nozzle to allow calcium concentration to exceed the concentration of sulfate in the magnesium-free saline stream and to form precipitates comprising calcium sulfate; (iii) injecting a modifier or an amine solvent or a mixture of a modifier and an amine solvent into the second precipitator at pressure between 30 psi and 1,100 psi through at least one nozzle to enhance calcium sulfate precipitates from the magnesium-free saline stream; (iv) removing precipitates from the magnesium-free saline stream by filtering to produce slurry of calcium sulfate and nearly magnesium-calcium free saline stream; (v) washing, filtering and drying of the calcium sulfate slurry; (vi) removing most of the amine solvent from the nearly magnesium-calcium free saline stream by stripping; (vii) if desirable, feeding the nearly magnesium-calcium free saline stream into desalination plants and auxiliary equipments; and/or (viii) if desirable, injecting the nearly magnesium-calcium free saline stream into subterranean formation for hydrocarbons recovery.

Calcium chloride rich formation water is natural brine, oil-fields produced water, coal-bed produced water, methane-bed produced water or a combination thereof. Desalination plants and auxiliary equipments are multi-stage flash, multi-effect distillation, vapor-compression, multi-effect submerged-tube evaporators, reverse osmosis, nanofiltration, vacuum membrane distillation, direct contact membrane distillation, membrane osmotic distillation, boilers, heat recovery steam generators, steam turbines, cooling towers, or a combination thereof.

In yet another aspect, the present invention provides a method for separating magnesium hydroxide and calcium in hydroxide form or carbonate form from oil-fields produced water to produce nearly magnesium-calcium free produced water and inorganic materials. The inventive method comprises the steps of: (a) converting the alkalinity of oil-fields produced water to carbon dioxide by adding an acid to produce nearly alkalinity-free produced water; (b) separating oil droplets from the nearly alkalinity-free produced water by hydrophobic membranes to produce de-oiled produced water; (c) removing magnesium hydroxide from de-oiled produced water to produce magnesium-free produced water; (d) removing calcium in the hydroxide form from the magnesium-free produced water to produce nearly magnesium-calcium free produced water; or (e) removing calcium in the carbonate form from the magnesium-free produced water to produce nearly magnesium-calcium free produced water; and (f) injecting the nearly magnesium-calcium free produced water into subterranean formation for hydrocarbons recovery or into suitable disposal wells. Magnesium hydroxide is removed from the de-oiled produced water in step (c) by (i) injecting the de-oiled produced water into a first precipitator at pressure between 30 psi and 1,100 psi through at least one nozzle; (ii) injecting an amine solvent into the first precipitator at pressure between 30 psi and the critical pressure of the amine solvent through at least one nozzle to form precipitates comprising magnesium hydroxide; (iii) injecting a modifier for the amine solvent into the first precipitator at pressure between 30 psi and 1,100 psi through at least one nozzle; (iv) removing precipitates from the de-oiled produced water by filtering to produce slurry of magnesium hydroxide and magnesium-free produced water; and (v) washing, filtering and drying of the magnesium hydroxide slurry. Calcium in the hydroxide form is removed from the magnesium-free produced water in step (d) by (i) injecting the magnesium-free produced water into a second precipitator at pressure between 30 psi and 1,100 psi through at least one nozzle; (ii) injecting an amine solvent into the second precipitator at pressure between 30 psi and the critical pressure of the amine solvent through at least one nozzle to form precipitates comprising calcium hydroxide from the magnesium-free produced water; (iii) injecting a modifier for the amine solvent into the second precipitator at pressure between 30 psi and 1,100 psi through at least one nozzle; (iv) removing precipitates from the magnesium-free produced water by filtering to produce slurry of calcium hydroxide and nearly magnesium-calcium free produced water; (v) washing, filtering and drying of the calcium hydroxide slurry; and (vi) removing at least most of the amine solvent from the nearly magnesium-calcium free produced water by stripping. Calcium in the carbonate form is removed from the magnesium-free produced water in step (e) by (i) injecting the magnesium-free produced water into a second precipitator at pressure between 30 psi and 1,100 psi through at least one nozzle; (ii) injecting carbon dioxide into the second precipitator at pressure between 30 psi and 1,100 psi through at least one nozzle; (iii) injecting an amine solvent into the second precipitator at pressure between 30 psi and the critical pressure of the amine solvent through at least one nozzle to form precipitates comprising calcium carbonate from the magnesium-free produced water; (iv) removing precipitates from the magnesium-free produced water by filtering to produce slurry of calcium carbonate and nearly magnesium-calcium free produced water; (v) washing, filtering and drying of the calcium carbonate slurry; and (vi) removing most of the amine solvent from the nearly magnesium-calcium free produced water by stripping.

In yet another aspect, the present invention provides a method for scrubbing sulfur dioxide from flue gas and separating magnesium hydroxide and calcium in carbonate form or sulfate form from a saline stream to produce nearly magnesium-calcium free saline stream and inorganic materials. The inventive method comprises the steps of: (a) reacting flue gas with a saline stream to absorb and convert sulfur dioxide in flue gas to sulfite, liberate carbon dioxide in a near pure form, and produce nearly alkalinity-free saline stream; (b) removing magnesium hydroxide from the nearly alkalinity-free saline stream to produce magnesium-free saline stream; (c) removing calcium in the carbonate form from the magnesium-free saline stream; or (d) removing calcium in the sulfate form from the magnesium-free saline stream. Magnesium hydroxide is removed from the nearly alkalinity-free saline stream in step (b) by (i) injecting the nearly alkalinity-free saline stream into a first precipitator at pressure between 30 psi and 1,100 psi through at least one nozzle; (ii) injecting an amine solvent into the first precipitator at pressure between 30 psi and the critical pressure of the amine solvent through at least one nozzle to form precipitates comprising magnesium hydroxide; (iii) injecting a modifier for the amine solvent into the first narrow precipitator at pressure between 30 psi and 1,100 psi through at least one nozzle; (iv) removing precipitates from the nearly alkalinity-free saline stream by filtering to produce slurry of magnesium hydroxide and magnesium-free saline stream; and (v) washing, filtering and drying of the magnesium hydroxide slurry. Calcium in the carbonate form is removed from the magnesium-free saline stream in step (c) by (i) injecting the magnesium-free saline stream into a second precipitator at pressure between 30 psi and 1,100 psi through at least one nozzle; (ii) injecting a portion of the liberated carbon dioxide from flue gas into the second precipitator at pressure between 30 psi and 1,100 psi through at least one nozzle; (iii) injecting an amine solvent into the second precipitator at pressure between 30 psi and the critical pressure of the amine solvent through at least one nozzle to form precipitates comprising calcium carbonate from the magnesium-free saline stream; (iv) removing precipitates from the magnesium-free saline stream by filtering to produce slurry of calcium carbonate and nearly magnesium-calcium free saline stream; (v) washing, filtering and drying of the calcium carbonate slurry; and (vi) removing most of the amine solvent from the nearly magnesium-calcium free saline stream by stripping; (vii) if desirable, injecting a portion of the liberated carbon dioxide from flue gas into subterranean formation for hydrocarbons recovery; and (viii) if desirable, feeding the nearly magnesium-calcium free saline stream into desalination plants and auxiliary equipments. Calcium in the sulfate form is removed from the magnesium-free saline stream in step (d) by (i) injecting the magnesium-free saline stream into a second precipitator at pressure between 30 psi and 1,100 psi through at least one nozzle; (ii) injecting calcium chloride rich formation water into the second precipitator at pressure between 30 psi and 1,100 psi through at least one nozzle to allow the concentration of calcium to exceed the concentration of sulfate in the magnesium-free saline stream and to form precipitates comprising calcium sulfate; (iii) injecting a modifier or an amine solvent or a mixture of a modifier and an amine solvent into the second precipitator at pressure between 30 psi and 1,100 psi through at least one nozzle to enhance calcium sulfate precipitates from the magnesium-free saline stream; (iv) removing precipitates from the magnesium-free saline stream by filtering to produce slurry of calcium sulfate and nearly magnesium-calcium free saline stream; (v) washing, filtering and drying of the calcium sulfate slurry; (vi) removing most of the amine solvent from the nearly magnesium-calcium free saline stream by stripping; (vii) if desirable, injecting the liberated carbon dioxide from flue gas into subterranean formation for hydrocarbons recovery; (viii) if desirable, feeding the nearly magnesium-calcium free saline stream into desalination plants and auxiliary equipments; or (ix) if desirable, injecting the nearly magnesium-calcium free saline stream into subterranean formation for hydrocarbons recovery.

In yet another aspect, the present invention provides a method for scrubbing sulfur dioxide from flue gas using a saline stream or a magnesium-rich aqueous stream. The inventive method comprises the steps of: (a) injecting the saline stream or the magnesium-rich aqueous stream into a precipitator at a pressure between 30 psi and 1,100 psi through at least one nozzle; (b) injecting an amine solvent into the precipitator at a pressure between 30 psi and the critical pressure of the amine solvent through at least one nozzle to form precipitates comprising magnesium hydroxide; (c) injecting flue gas into the precipitator at pressure between 30 psi and 1,100 psi through at least one nozzle to react sulfur dioxide in flue gas with precipitates of magnesium hydroxide to produce magnesium sulfite and magnesium sulfate; (d) oxidizing magnesium sulfite to produce magnesium sulfate; (e) removing at least most of the amine solvent from the saline stream or the magnesium-rich aqueous stream by stripping; (f) liberating carbon dioxide in a near pure form from flue gas; (g) recycling the saline stream or the magnesium-rich aqueous stream and the amine solvent to the precipitator; and (h) if desirable, injecting the liberated carbon dioxide from flue gas into subterranean formation for hydrocarbons recovery.

In yet another aspect, the present invention provides a method for separating magnesium hydroxide and scrubbing of flue gas to produce calcium carbonate and nearly magnesium-calcium free formation water using calcium chloride rich formation water. The inventive method comprises the steps of: (a) converting the alkalinity of the calcium chloride rich formation water to carbon dioxide by adding an acid to produce nearly alkalinity-free calcium chloride rich formation water; (b) removing magnesium hydroxide from the nearly alkalinity-free calcium chloride rich formation water and to produce magnesium-free calcium chloride rich formation; and (c) reacting flue gas with the magnesium-free calcium chloride rich formation water to produce calcium carbonate. Magnesium hydroxide is removed from the nearly alkalinity-free calcium chloride rich formation in step (b) by (i) injecting the nearly alkalinity-free calcium chloride rich formation water into a first precipitator at pressure between 30 psi and 1,100 psi through at least one nozzle; (ii) injecting an amine solvent into the first precipitator at pressure between 30 psi and the critical pressure of the amine solvent through at least one nozzle to form precipitates comprising magnesium hydroxide; (iii) injecting a modifier for the amine solvent into the first precipitator at pressure between 30 psi and 1,100 psi through at least one nozzle; (iv) removing precipitates from the nearly alkalinity-free calcium chloride rich formation water by filtering to produce slurry of magnesium hydroxide and magnesium-free calcium chloride rich formation water; and (v) washing, filtering and drying of the magnesium hydroxide slurry. Calcium carbonate is produced from reacting flue gas with the magnesium-free calcium chloride rich formation in step (c) by (i) injecting the magnesium-free calcium chloride rich formation water into a second precipitator at a pressure between 30 psi and 1,100 psi through at least one nozzle; (ii) injecting an amine solvent into the second precipitator at a pressure between 30 psi and the critical pressure of the amine solvent through at least one nozzle to form precipitates comprising calcium hydroxide; (iii) injecting flue gas into the second precipitator at pressure between 30 psi and 1,100 psi through at least one nozzle to react flue gas with precipitates of calcium hydroxide to produce calcium sulfite, calcium sulfate, and precipitates comprising calcium carbonate; (iv) oxidizing calcium sulfite to produce calcium sulfate; (iv) removing precipitates from the magnesium-free calcium chloride rich formation water by filtering to produce slurry of calcium carbonate and nearly magnesium-calcium free formation water; (v) washing, filtering and drying of the calcium carbonate slurry; (vi) removing at least most of the amine solvent from the nearly magnesium-calcium free formation water by stripping; and (vii) injecting the nearly magnesium-calcium formation water into subterranean formation for hydrocarbons recovery or into suitable disposal wells.

In yet another aspect, the present invention provides a method for scrubbing flue gas using calcium chloride rich formation water to produce dolomite and nearly magnesium-calcium free formation water. The inventive method comprises the steps of (a) injecting calcium chloride rich formation water into a precipitator at a pressure between 30 psi and 1,100 psi through at least one nozzle; (b) injecting an amine solvent into the precipitator at a pressure between 30 psi and the critical pressure of the amine solvent through at least one nozzle to form precipitates comprising magnesium hydroxide and calcium hydroxide; (c) injecting flue gas into the precipitator at pressure between 30 psi and 1,100 psi through at least one nozzle to react flue gas with precipitates of magnesium hydroxide and calcium hydroxide to produce magnesium sulfite, magnesium sulfate, calcium sulfite, calcium sulfate and precipitates comprising dolomite; (d) oxidizing magnesium sulfite and calcium sulfite to produce magnesium sulfate and calcium sulfate; (e) removing precipitates from the calcium chloride rich formation water by filtering to produce slurry of dolomite and nearly magnesium-calcium free formation water; (f) washing, filtering and drying of the dolomite slurry; (g) removing most of the amine solvent from the nearly magnesium-calcium free formation water by stripping; and (h) injecting the nearly magnesium-calcium formation water into subterranean formation for hydrocarbons recovery or into suitable disposal wells.

This invention is of particular interest in connection with applications such as, but not limited to, inorganic materials production, saline water desalination, spent saline water, oil and gas, mining, geothermal power plants, flue gas desulphurization and sequestration, flare emission from crude oil production operations, coal- or oil-fired power plants, industrial boilers, and cooling towers.

This invention is not restricted to use in connection with one particular application. This invention can be used, in general, for the selective removal of inorganic materials from aqueous streams with precipitates ranging from submicron to macro sizes. Further objects, novel features, and advantages of this invention will be apparent to those skilled in the art upon examining the accompanying drawings and the following description of the preferred embodiments, or may be learned by practice of this invention.

DESCRIPTION OF THE PREFERRED EMBODIMENT

The Precipitation Concept

Figure 1:
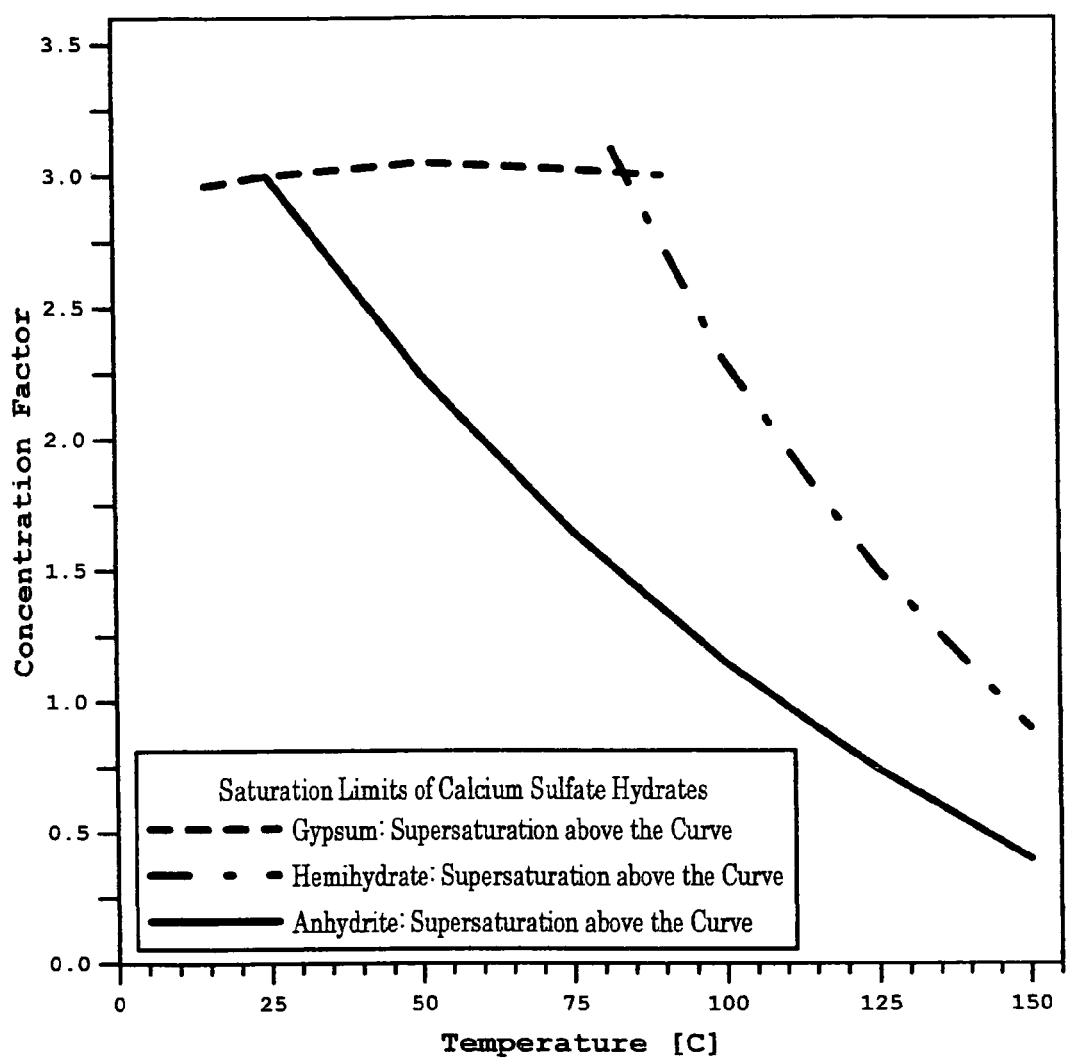
FIG. 1 illustrates concentration factors vs. approximate saturation limits of calcium sulfate hydrates in the Arabian Gulf seawater.

I have previously invented the Liquid-Phase Precipitation (LPP) process for the separation of inorganic species from aqueous streams. The effect of the separation in the LPP process is to intermix the aqueous solution with a suitable solvent at ambient temperature and atmospheric pressure to form selective precipitates. The suitable solvents are those which have the capability to meet two basic criteria.

The first criteria is the suitability to precipitate targeted inorganic species from aqueous solutions. The selected organic solvent must be miscible with the aqueous phase. Of equal importance, the targeted inorganic species must be sparingly soluble in the organic solvent. The addition of such a solvent to an inorganic-aqueous solution leads to the capture of part of the water molecules and reduces the solubility of inorganic species in the water which form insoluble precipitates. The solubility of the targeted inorganic species in the organic solvent is a critical factor in achieving the degree of saturation. Therefore, solubility related factors such as ionic charge, ionic radius, and the presence of a suitable anion in the aqueous solution (its effect on pH rate) play an important role in affecting and characterizing precipitates formation.

The second criteria is suitability for overall process design. For ease of recovery, the selected solvent must have favorable physical properties such as low boiling point, high vapor pressure, high relative volatility, and no azeotrope formation with water. From a process design standpoint, the selected solvent must have low toxicity since traces of the organic solvent always remain in the discharge stream. Further, the selected solvent must be chemically stable, compatible with the process, and relatively inexpensive.

Several solvents have been identified for potential use in the LPP process. These solvents are isopropylamine (IPA), ethylamine (EA), propylamine (PA), dipropylamine (DPA), diisopropylamine (DIPA), diethylamine (DEA), and dimethylamine (DMA). However, IPA is the preferred solvent in the LPP process. The preference of IPA is attributed to its high precipitation ability with different basic salts, favorable properties (boiling point: 32.4° C.; vapor pressure: 478 mmHg at 20° C.); and minimal environmental risks.

Improving the precipitation process performance is always a target. One of the improvements is to reach saturation faster particularly for inorganics with intermediate aqueous solubility limits or low initial concentrations in aqueous streams. Such an improvement would minimize the use of the amine solvent and reduce the size of the precipitation equipment. Another improvement is to produce controllable precipitates that are uniformly distributed with high yield and preferably in submicron sizes.

Submicron precipitates are fundamentally stable and form spontaneously if a narrow resistance time distribution is improvised and/or a surface active agent (naturally existing or induced) sufficiently acts as a dispersant to prevent immediate agglomeration of the newly formed precipitates. Submicron precipitates are thus dispersed phase with extreme fluxionality. On the other hand, non-spontaneous unstable macro-size precipitates will form if given sufficient time to rest.

The state (stabile, metastabe, or unstable) of given precipitates can be expressed thermodynamically by the Gibbs-Helmholtz relation as follows:

$$\Delta G = \Delta H - T\Delta S \quad (13)$$

where $\Delta G$ is precipitates free energy (provided by, for instance, mechanical agitation or other means), $\Delta H$ is the enthalpy that represents the binding energy of the dispersed phase precipitates in the aqueous stream, T is the temperature, and $\Delta S$ is the entropy of the dispersed phase precipitates (the state of precipitates disorder). The binding energy ($\Delta H$) can be expressed in terms of the surface tension ($\tau$) and the increase in the surface area ($\Delta A$) as follows:

$$\Delta G = \tau \Delta A - T\Delta S \quad (14)$$

When the introduced free energy into the aqueous stream exceeds the binding energy of precipitates, individual precipitates are broken down and redistributed. In addition, when a surface active agent is present in the aqueous stream as an effective dispersant, $\tau$ is reduced and thus the precipitates binding energy is diminished. Furthermore, part of the introduced energy may not contribute to precipitates deflocculating but it dissipates in the aqueous stream in the form of heat which reduces viscosity. All of these factors increase precipitates disorder (positive entropy). As such, the change in the entropy ($\Delta S$) quantitatively defines precipitates dispersion.

The Compressed-Phase Precipitation (CPP) process is developed to achieve sub-micron precipitates in certain applications. CPP is conceptually similar to LPP in which the targeted inorganic species must be nearly insoluble in the amine solvent whereas the mother solvent (water) is miscible with the amine solvent. However, the difference is that fluids in the CPP process are subjected to: (1) pressure and/or temperature manipulations; and/or (2) modifications. Thus, they are forced to exhibit unusual thermophysical properties such as liquid-like density but with higher diffusivity, higher compressibility and lower viscosity.

The fast diffusion combined with low viscosity of the compressed amine solvent into the inorganic-aqueous phase produces faster supersaturation of the inorganic species and its possible precipitation in the desired and sub-micron and micron sizes. Thus, the precipitate-size as well as the precipitate-size distribution, morphology, and crystal structure can be controlled. The achievement of faster supersaturation degree would, in turn, minimize the use as well as maximize the recovery of the amine solvent, minimize the size of precipitator vessels, and allow the recovery of the targeted inorganic species in the desired precipitates shape and distribution.

However, several factors could influence the performance of the CPP process. These factors are: (1) the initial concentration and the mass flow rate of the targeted inorganic species in the aqueous stream; (2) the injection methods of both the aqueous stream and the amine solvent into the precipitator vessel; and (3) pressures, temperatures, and modifications of both the saline stream and the amine solvent. The following discussion highlights these factors.

The Targeted Ions

The selected amine solvents for the precipitation process are weak bases which do not furnish the hydroxide ion directly by dissociation. The volume of the selected amine solvent that will be used for precipitation is expected to be low compared to the volume of the saline stream. Thus, the pH of the mixed stream (the amine solvent and the saline stream) is the key factor to control the precipitation of $Mg(OH)_2$ as well as other inorganic precipitates such as the calcium ion in the form of either hydroxide or carbonate or sulfate.

The aqueous solubility limit of $Mg(OH)_2$ is very low (13.3 mg/L at 20° C.). The nucleation (induction) period for $Mg(OH)_2$ precipitation is about one second and decreases sharply with increasing the concentration of the magnesium ion. As such, the appearance of $Mg(OH)_2$ precipitates is instantaneous indicating that the design of the precipitation vessel can play a vital role in determining the properties of precipitates.

Table 3, for example, presents ions concentrations in samples of seawater, MSF brine, natural brine, and oil-fields produced water (the Arabian Gulf). The concentrations of the magnesium ion in MSF brine or natural brine or produced water are at least about 2-times higher than its concentration in seawater. As such, it is advantageous to use MSF brine or natural brine or produced water as a source for the magnesium ion. However, the concentrations of calcium and boron particularly in natural brine and produced water, which could interfere with the precipitation of $Mg(OH)_2$, are also higher than their concentrations in seawater.

$Ca(OH)_2$ could possibly co-precipitate with $Mg(OH)_2$. However, the aqueous solubility limit of $Ca(OH)_2$ is 1,628 mg/L at 20° C. which is much higher than the aqueous solubility limit of $Mg(OH)_2$. In addition, the isoelectric point (neutral charge) of $Mg(OH)_2$ is at about 12 pH value. Below such a pH value, the zeta potential of $Mg(OH)_2$ is positively charged, which would repel calcium as a positively charged ion. When de-carbonated (by acid treatment to convert the bicarbonate/carbonate content to $CO_2$ and then to deplete $CO_2$) seawater, MSF brine, and natural brine (Table 3) are tested for the selective precipitation of $Mg(OH)_2$ using IPA as a precipitation agent, the magnesium ion in the form of hydroxide was nearly completely precipitated (>99.9%) from each of such saline streams within 9.9-10.4 of pH values whereas the dissolved calcium ion in such streams remains essentially unchanged. The precipitation of $Ca(OH)_2$ starts appreciably taking place as the pH values increase (11.5-12.5) with the increase in the amounts of IPA. As such, the sequential precipitation of $Mg(OH)_2$ and $Ca(OH)_2$ can be accomplished by controlling the pH value.

Alternatively, the dissolved calcium ion in the saline stream can be precipitated in the form of carbonate to produce calcium carbonate ($CaCO_3$) by reacting it with the recycled $CO_2$ from the de-carbonation step (or from an external source such as treated flue gas) in the presence of an amine solvent (to control the pH). The removal of the calcium ion from the saline stream in the form of carbonate instead of hydroxide minimizes the use of the amine solvent (since it requires lower pH compared to the precipitation of $Ca(OH)_2$) as well as reutilizes a flue gas ($CO_2$) and renders it useful. It is worth noting that the concentration of the calcium ion in the form chloride in natural brine (Table 3) is extremely high which would allow a significant production of $CaCO_3$. $CaCO_3$ is also an important material in industries such as cement, paper, plastics, rubber, paints, pharmacy products and cosmetics. Once again, such industries demand well-defined $CaCO_3$ precipitates (uniform precipitates with narrow size distribution).

Alternatively, if the concentration of calcium in seawater or brine from seawater desalination plants is externally supplemented to at least match or exceed the concentration of sulfate in such streams, the precipitation of $CaSO_4.2H_2O$ instead of $Ca(OH)_2$ or $CaCO_3$ can also be accomplished. Rock formations of most brine aquifers and oil fields in the Arabian Gulf area are carbonate-based. Such formation waters are therefore chloride rich that contain significant concentrations of calcium. Table 3, for example, reveals that natural brine and produced water are indeed rich with calcium chloride, which can be used as external sources for the calcium ion.

If the recovery of $Mg(OH)_2$ along with the calcium ion in the form of hydroxide or carbonate or sulfate from seawater is combined with seawater desalination plants, the removal of both magnesium and calcium ions from seawater would allow the operation of seawater desalination plants in a complete scale free manner (control of both alkaline and sulfate scale). In the case of recovering the calcium ion in the form of hydroxide or carbonate, the remaining salts in seawater are practically sodium chloride and sodium sulfate. However, in the case of recovering the calcium ion in the form of sulfate, the remaining salt in seawater is practically sodium chloride. Either arrangement, which can be easily fit within the layouts of existing plants, would be a major break through in seawater desalination since it would: (1) substantially increase the productivity of seawater desalination plants, particularly thermal-driven from about 10% to about 78% by recycling its scale-free brine up to the saturation limit of either sodium chloride or sodium sulfate; (2) appreciably reduce the cost of once-through seawater pre-treatment step (e.g., acid treatment, $CO_2$ venting, oxygen depletion, caustic pH re-adjustment, addition of scale inhibitors, and seawater preheating); (4) entirely eliminate frequent expensive workovers and shutdown time to combat alkaline-sulfate scales build-up; (5) protect the marine environment from the release of copious amounts of spent seawater; and (6) allow the recovery of the near saturated sodium sulfate and/or sodium chloride salts, if desirable.

Figure 2:
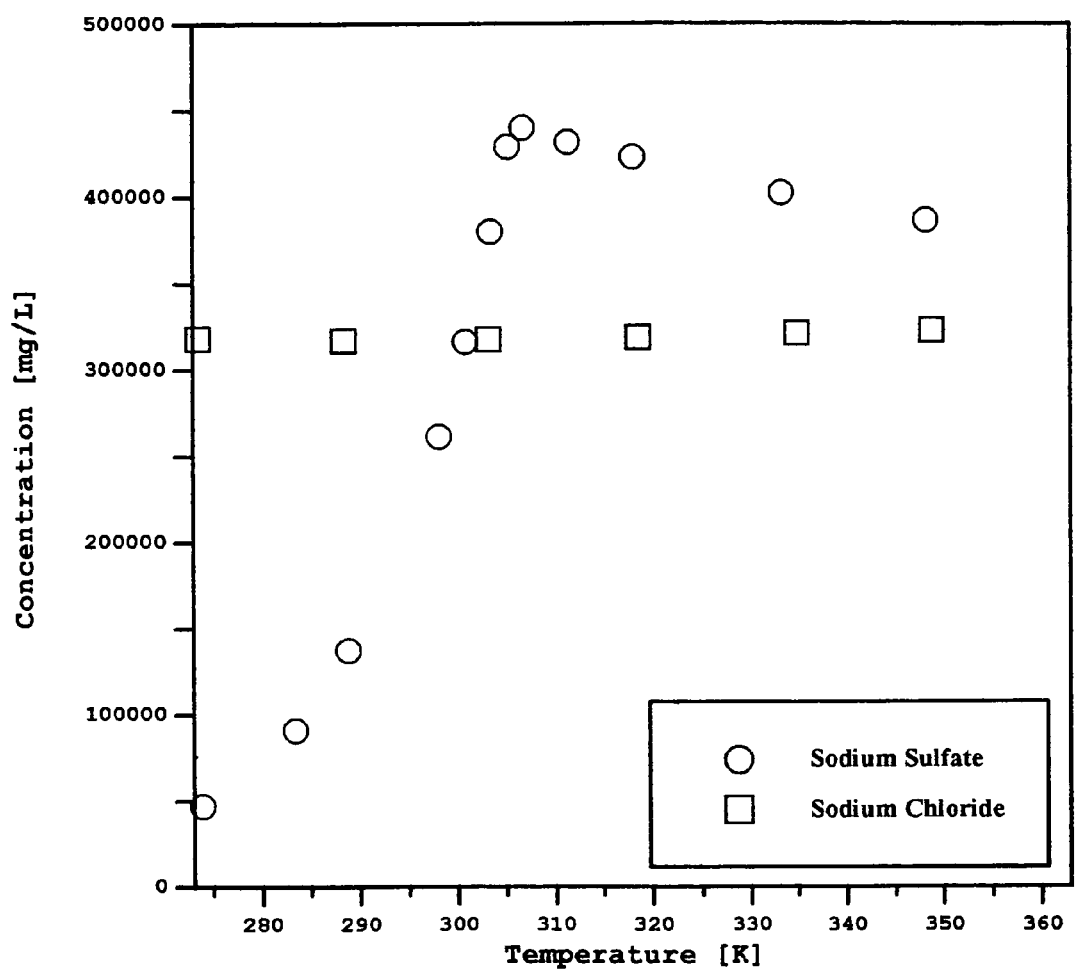
FIG. 2 illustrates aqueous solubility limits of sodium chloride and sodium sulfate.

FIG. 2 shows the individual aqueous solubility limits of sodium sulfate and sodium chloride as a function of temperatures at atmospheric pressure. The solubility limits of sodium chloride are almost flat (slightly increase with increasing temperatures). As such, the separation of sodium sulfate from sodium chloride can be achieved by: (1) changing temperatures (cooling in the case of precipitating the decahydrate form and heating in the case of precipitating the anhydrous form); or (2) forcing the precipitation of sodium sulfate by adding an amine solvent; or (3) using selective membranes for the sulfate ion such as Nanofiltration.

It is worth noting that there are no regulations for trace limits of the selected amine solvents in drinking water. However, the selected amine solvents behave like ammonia ($NH_3$). The limit for ammonia in drinking water is 2 mg/L, which might be used a potential guideline for the amine solvent trace amount in drinking water.

Boron in saline streams is normally present as a boric acid ($H_3BO_3$) and borate ions (e.g., $B(OH)_4^-$). When the concentration of the total born in saline streams is less than 270 mg/L, the present boron species would highly likely be in the forms of $H_3BO_3$ and/or $B(OH)_4^-$. $H_3BO_3$ behaves as a weak monobasic acid which acts not as a proton donor but rather as an electron acceptor (taking $OH^-$):

$$H_3BO_3 + H_2O \leftrightarrow B(OH)_4^- + H^+ \quad (15)$$

The ionization constant of $H_3BO_3$ in the saline stream increases with increasing pH values and the concentrations of strong ions. As such, strong cations such as sodium, magnesium and calcium tend to pair with boron in saline streams ($NaB(OH)_4^0$, $MgB(OH)_4^-$, and $CaB(OH)_4^-$). The type of the cation dictates the zeta potential of its paired borate ion. In the pH range that extends from 7.5 to 11, $NaB(OH)_4^0$ exhibits a negative zeta potential, $MgB(OH)_4^-$ exhibits a slightly positive (near neutral) zeta potential, and $CaB(OH)_4^-$ exhibits a positive zeta potential at pH values below 10.5 and a negative zeta potential at pH values above 10.5. Since the zeta potential of $Mg(OH)_2$ is positive up to about 12 pH value, the surface charge of the maximally precipitated $Mg(OH)_2$ by the amine solvent within 9.9-10.4 of pH values would strongly repel $CaB(OH)_4^-$, weakly repel $MgB(OH)_4^-$, and attract $NaB(OH)_4^0$. As such, about 25-30% of the boron content would precipitate with $Mg(OH)_2$.

Injection Methods

Various jet injection devices such as premixed nozzles, coaxial nozzles, spray nozzles, vibrating orifices or nozzles, ultrasonic nozzle and others can be used in applying the precipitation process. Although the effectiveness of the process lies within the ability of the amine solvent to precipitate inorganic species, the efficiency of the injection device (contact between the amine solvent and saline water) is also important. If the nucleation (precipitate formation) and condensation (precipitate growth) mechanisms are fast enough, then precipitates will reach a high degree of supersaturation in a very short period of time and within the precipitator vessel. This would allow appreciable reduction in the size of the precipitator vessel and a high degree of precipitates uniformity in submicron sizes.

A possible injection method is to use a nozzle to co-introduce and pre-mix the saline stream with the amine solvent before entering the precipitation vessel. This provides a simple and efficient injection method for intensive mass-transfer and fast nucleation of the targeted inorganic species.

A second possible injection method is a concentric nozzle in which the saline stream flows through the inner tube while the amine solvent flows through the coaxial annulus. Therefore, the main mechanism of the jet hydrodynamic mixing is that the saline stream draws in the amine fluid from the surrounding mass of such a fluid. The smaller the nozzle diameters are the higher the inlet velocities of the compressed fluids. This provides an efficient micro-mixing. The highest nucleation of precipitates takes place at the border of the jet stream (region of contact) whereas the highest condensation of precipitates takes place at the center of the jet stream due to the high turbulence impact and inorganic concentrations in the center of the jet.

A third possible method is based on injecting the amine and saline stream into the precipitator vessel via two separate nozzles. If the velocities of the injected fluids are not equal, however, fast and/or a significantly high degree of supersaturation may not be achieved. Therefore, the induction and condensation periods for precipitates will be longer. This could affect the design of the precipitator vessel (the need for a larger instead of a smaller precipitator vessel, further mixing, or precipitates seeding). In addition, a moderate degree of supersaturation leads to larger precipitates.

Underestimation of the mixing step between the saline stream and the amine solvent may lead to ineffective design of precipitation vessels. Uniform precipitates are highly desirable for industrial applications. In addition, the quality of dewatering is directly affected by precipitates uniformity and size distribution.

Effect of Pressure, Temperature, and Modifier

Table 4 reveals that the selected amine solvents have relatively low critical pressures and moderate critical temperatures. As the carbon number of the selected amine solvents increases, critical pressures decrease while critical temperatures (as well as boiling temperatures) increase. The critical pressures of the selected amine solvents vary between about 440-1,090 psi.

Table 4 shows that the critical temperatures of the selected amine solvents lie within the desired intermediate thermal region (127-327° C. or 400-600K). Such a thermal region permits the stabilization of the kinetic phase rather than the thermodynamic phase. However, it is economically preferable and in some cases technically desirable to operate the precipitation process at ambient temperature or at the stream's temperature (e.g. MSF brine). This can be achieved by either using an amine solvent at sub-critical temperature, or by matching it with an appropriate modifier to achieve a lower critical temperature while maintaining its polarity, basicity, miscibility and precipitating ability.

Molecules containing a hydrogen atom bonded to nitrogen, or oxygen, or fluorine form a strong dipole-dipole interaction and hydrogen bonding. Primary amines undergo hydrogen bonding. Such amines are thus polar solvents and completely miscible in water. However, they are less polar than alcohols. This stems from the fact that the N—HN hydrogen bond between amine molecules is weaker than the O—HO hydrogen bond between alcohol molecules because nitrogen is less electronegative than oxygen, which results in low boiling points of primary amines.

Nitrogen ($N_2$) can form compounds with only three covalent bonds to other atoms. An amine molecule contains $sp^3$-hybridized nitrogen atom bonded to one or more carbon atoms. The nitrogen has one orbital filled with a pair of unshared valence electrons, which allows these compounds to act as bases. Amines are therefore weak bases that could undergo reversible reactions with water or other weak acids. However, when an amine reacts with a strong acid, the unshared electrons of the amine are used to form sigma bond with the acid, which drives the reaction to completion (irreversibly).

Nitrous oxide ($N_2O$) or $N_2$ can thus be possible modifiers for the selected amine solvents since they are both miscible in amine solvents. $N_2O$ is a nontoxic low polarity fluid with favorable critical properties (almost similar to $CO_2$ except it has a permanent dipole moment). However, $N_2$ is an inert non-polar fluid with a very low critical temperature (−147° C. or 126.2 K) and a moderate critical pressure (490.8 psi or 33.4 atm) that is close to the critical pressures of the selected amine solvents. $N_2$ could potentially provide a critical temperature for a mixture of $N_2$ and a selected amine solvent that lies proximate to ambient temperature. Air would be a possible source for $N_2$ since $N_2$ constitutes 79% of the air content.

Acid gases such as $SO_2$ can be used to reduce the pH of saline streams and thus convert the alkalinity of saline streams to $CO_2$. If $SO_2$ from flue gas is absorbed by a saline stream, then it could replace the typical acidification step of the saline stream. The liberated $CO_2$ from the flue gas and from the saline stream alkalinity conversion can be advantageously used to induce and control $CaCO_3$ precipitation.

Precipitation of $Mg(OH)_2$

Figure 3:
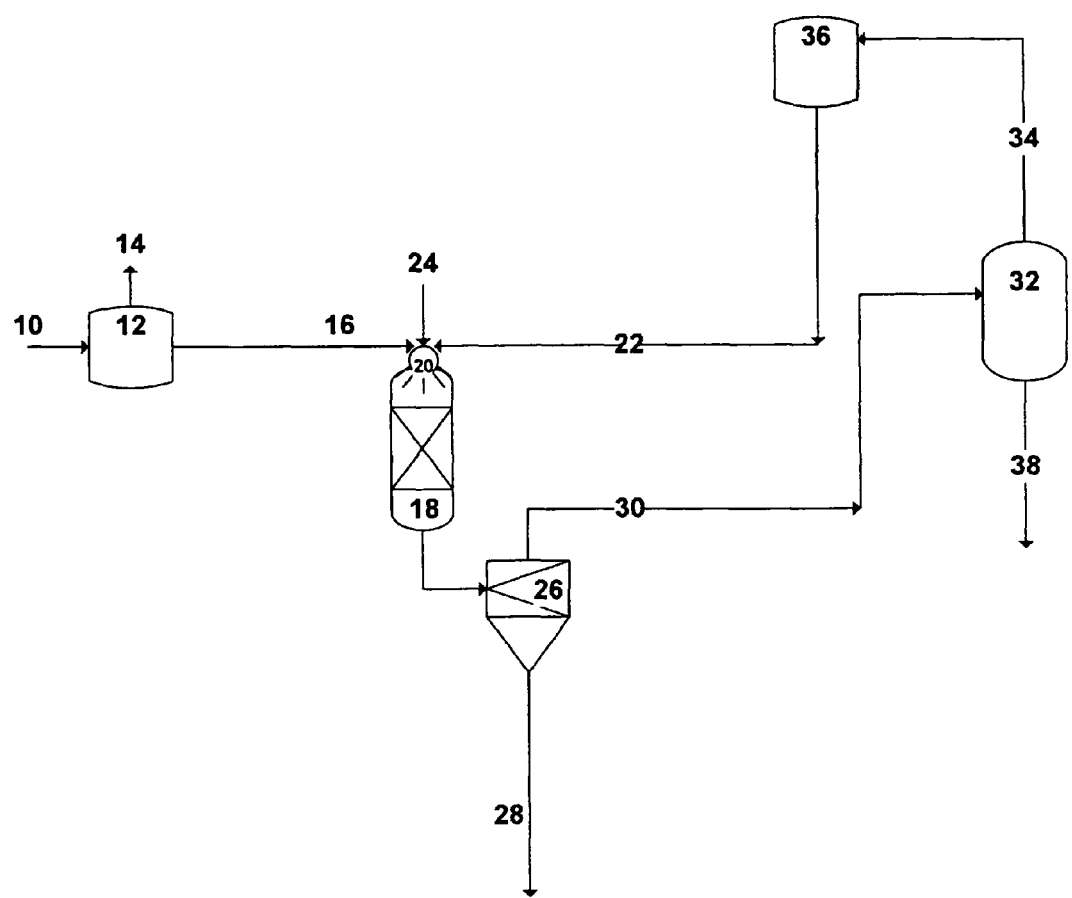
FIG. 3 illustrates a possible flow diagram for $Mg(OH)_2$ precipitation.

The precipitation of $Mg(OH)_2$ from saline streams can be accomplished in a single stage as shown in FIG. 3. A saline stream (e.g., seawater, MSF brine, natural brine, and the like) [10] will be acidified [12] to convert it's alkalinity to $CO_2$ [14]. The near alkalinity-free saline stream [16] will then be delivered to a narrow precipitator unit [18] preferably via a pre-mixing nozzle [20]. A selected amine solvent will simultaneously be delivered [22] to the precipitator unit [18] through the same pre-mixing nozzle [20]. A modifier [24] for the amine solvent such as $N_2$ or $N_2O$ or air will also simultaneously be injected to the precipitator unit [18] preferably via the same pre-mixing nozzle [20]. The pressure of the three injected fluids (saline stream, amine solvent and modifier) is between 30 and 1,100 psi. The outlet stream from the precipitator unit [18] will be fed to a primary filtration unit [26], preferably a centrifuge or an ultra-filter, to recover $Mg(OH)_2$ precipitates. The recovered precipitates [28] will pass through a cycle of washing, filtering and drying (not shown).

The decanted stream [30] that is nearly free of the magnesium ion will be fed into a vapor-liquid equilibrium based stripping unit [32] to separate the decanted stream from the amine solvent. The stripping unit could be a flash drum, a vacuum or a standard distillation tower, a vacuum membrane distillation unit, or a pervaporation unit. The recovered amine solvent [34] will be recycled to the solvent storage tank [36]. The final decanted stream [38] that is nearly free of magnesium and amine solvent will be: (1) returned back to the sea (in the case of using seawater or brine from seawater desalination plants); or (2) injected into suitable disposal wells or used for oil fields water injection operations (in the case of using natural brine).

It should be understood that: (1) multiple precipitator units in the same precipitation stage can be implemented as needed; (2) multiple pre-mixing nozzles can be installed within a single precipitator unit as needed; (3) the saline stream, amine solvent, and modifier can also be injected into the precipitator unit via three separate spray nozzles; (4) the amine solvent and its modifier can also be injected via the coaxial annulus of a concentric nozzle to contact the saline stream that can be injected separately via the inner tube of the same concentric nozzle; and (5) multiple concentric nozzles can also be installed within a single precipitator unit as needed.

It should also be understood that the final washing and filtering cycle for $Mg(OH)_2$ precipitates [28] may contain a stripping unit to recover and recycle the trace amount of the amine solvent. It should also be understood that $Mg(OH)_2$ precipitates [28] can be used directly as final products (e.g., flame retardant resins) or coated with surface agents in wet or dry forms as final products.

It should also be understood that a magnesium-rich aqueous stream can be used instead of a saline stream for the precipitation of $Mg(OH)_2$. Such a magnesium-rich aqueous stream contains, for example, magnesium chloride, magnesium sulfate, magnesium sulfite, magnesium nitrate, magnesium fluoride, magnesium bromide, magnesium iodide, magnesium bromate, magnesium chlorate, magnesium chlorite, and magnesium chromate. In the case of using a magnesium-rich aqueous stream, however, the de-carbonation steps [10-14] as shown in FIG. 3 can be eliminated.

Precipitation of $Mg(OH)_2$ and Calcium Salts
(Hydroxide or Carbonate or Sulfate)

Several possible approaches can be employed in conducting the precipitation process in a dual-stage using saline streams. In such approaches, the selective precipitation of $Mg(OH)_2$ takes place in the first stage while the selective precipitation of the calcium ion in the form of either hydroxide or carbonate or sulfate takes place in the second stage.

Figure 4:
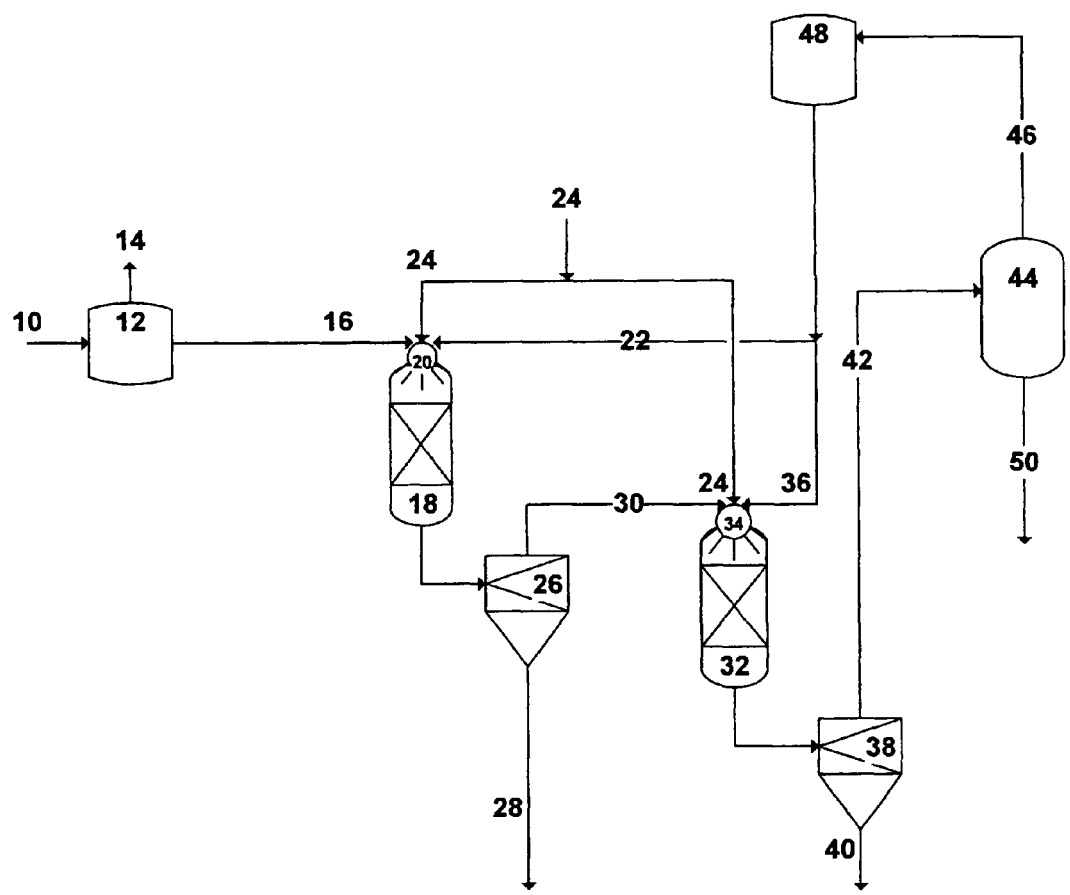
FIG. 4 illustrates a possible flow diagram for the precipitation of $Mg(OH)_2$ and $Ca(OH)_2$ from seawater or brine from seawater desalination plants or natural brine.

FIG. 4 depicts a simplified possible flow diagram illustrating the dual-stage precipitation process in which the selective precipitation of $Mg(OH)_2$ is conducted in the first stage whereas the selective precipitation of $Ca(OH)_2$ is conducted in the second stage. A saline stream (e.g., seawater, MSF brine, natural brine, and the like) [10] will be acidified [12] to convert it's alkalinity to $CO_2$ [14]. The nearly alkaline-free saline stream [16] will then be delivered to the first narrow precipitator unit [18] preferably via a pre-mixing nozzle [20]. A selected amine solvent will simultaneously be delivered [22] to the precipitator unit [18] through the same pre-mixing nozzle [20]. A modifier [24] for the amine solvent such as $N_2$, $N_2O$ or air will simultaneously be injected to the precipitator unit [18] preferably via the same pre-mixing nozzle [20]. The pressure of the three injected fluids (saline stream, amine solvent and modifier) is between 30 and 1,100 psi. The outlet stream from the first precipitator unit [18] will be fed to the first primary filtration unit [26], preferably a centrifuge or an ultra-filter, to recover $Mg(OH)_2$ precipitates. The recovered precipitates [28] will pass through a cycle of washing, filtering and drying (not shown).

The decanted stream [30] from the first primary filtration unit [26] that contains nearly magnesium free saline stream will be fed to the second narrow precipitator unit [32] via a pre-mixing nozzle [34]. A further amount of the selected amine solvent will simultaneously be delivered [36] to the precipitator unit [32] through the same pre-mixing nozzle [34]. A modifier [24] for the amine solvent such as $N_2$, $N_2O$ or air will also simultaneously be injected to the precipitator unit [32] via the same pre-mixing nozzle [34]. The pressure of the three injected fluids (saline stream, amine solvent and modifier) is between 30 and 1,100 psi. The outlet stream from the second precipitator unit [32] will be fed to the second primary filtration unit [38], preferably a centrifuge or an ultra-filter, to recover $Ca(OH)_2$ precipitates. The recovered precipitates [40] will pass through a cycle of washing, filtering and drying.

The decanted stream [42] that is nearly free of the magnesium and calcium ions will be fed into a vapor-liquid equilibrium based stripping unit [44] to separate the decanted stream from the amine solvent. The stripping unit could be a flash drum, a vacuum or a standard distillation tower, a vacuum membrane distillation unit, or a pervaporation unit. The recovered amine solvent [46] will be recycled to the solvent storage tank [48].

It should be understood that each of the final washing and filtering cycle for $Mg(OH)_2$ precipitates [28] and $Ca(OH)_2$ precipitates [40] may contain a stripping unit to recover and recycle the trace amounts of the amine solvent.

If the saline stream is seawater or brine from seawater desalination plants, the final decanted stream that is nearly free of magnesium, calcium and amine solvent [50] will be returned back to the sea (once-through basis) or it will be used as a feed stream for desalination plants and auxiliary equipments. However, if the saline stream is natural brine, the final decanted stream [50] will be injected into suitable disposal wells or used for oil-fields saline water injection operations.

It should also be understood that desalination plants and auxiliary equipments include, but not limited, multi-stage flash, multi-effect distillation, vapor-compression, multi-effect submerged-tube evaporators, reverse osmosis, nanofiltration, vacuum membrane distillation, direct contact membrane distillation, membrane osmotic distillation, boilers, heat recovery steam generators, steam turbines, cooling towers, or a combination thereof.

Figure 5:
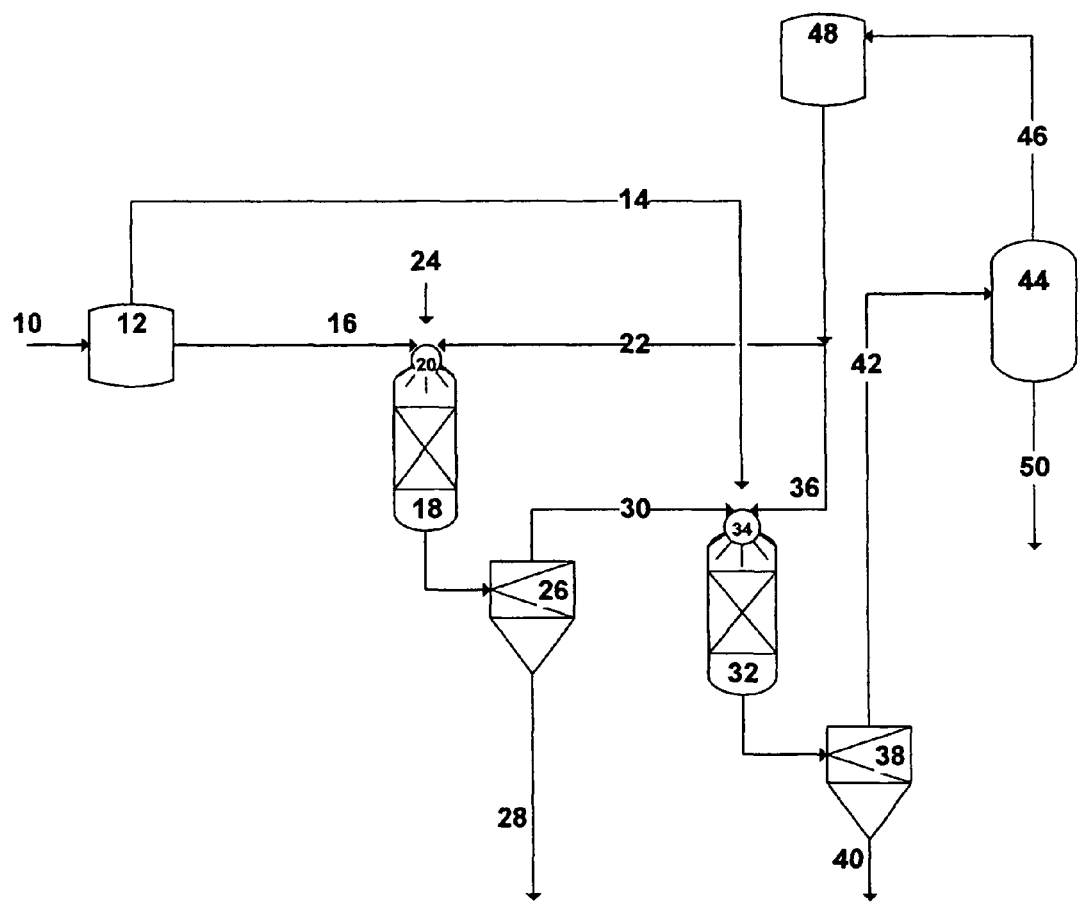
FIG. 5 illustrates a possible flow diagram for the precipitation of $Mg(OH)_2$ and $CaCO_3$ from seawater or brine from seawater desalination plants or natural brine.

Alternatively, FIG. 5 shows that the second precipitation stage is conducted for the production of $CaCO_3$ instead of $Ca(OH)_2$. The only difference in the precipitation of $CaCO_3$ is that the recovered $CO_2$ [14] from the acidification [12] of the saline stream is used as a modifier instead of $N_2$, $N_2O$ or air. $CO_2$ make-up to balance the concentration of the calcium ion in the saline stream can be imported from an external source (e.g., treated flue gas). The rest of the processing steps as given in FIG. 5 are identical to the processing steps as described in FIG. 4.

Figure 6:
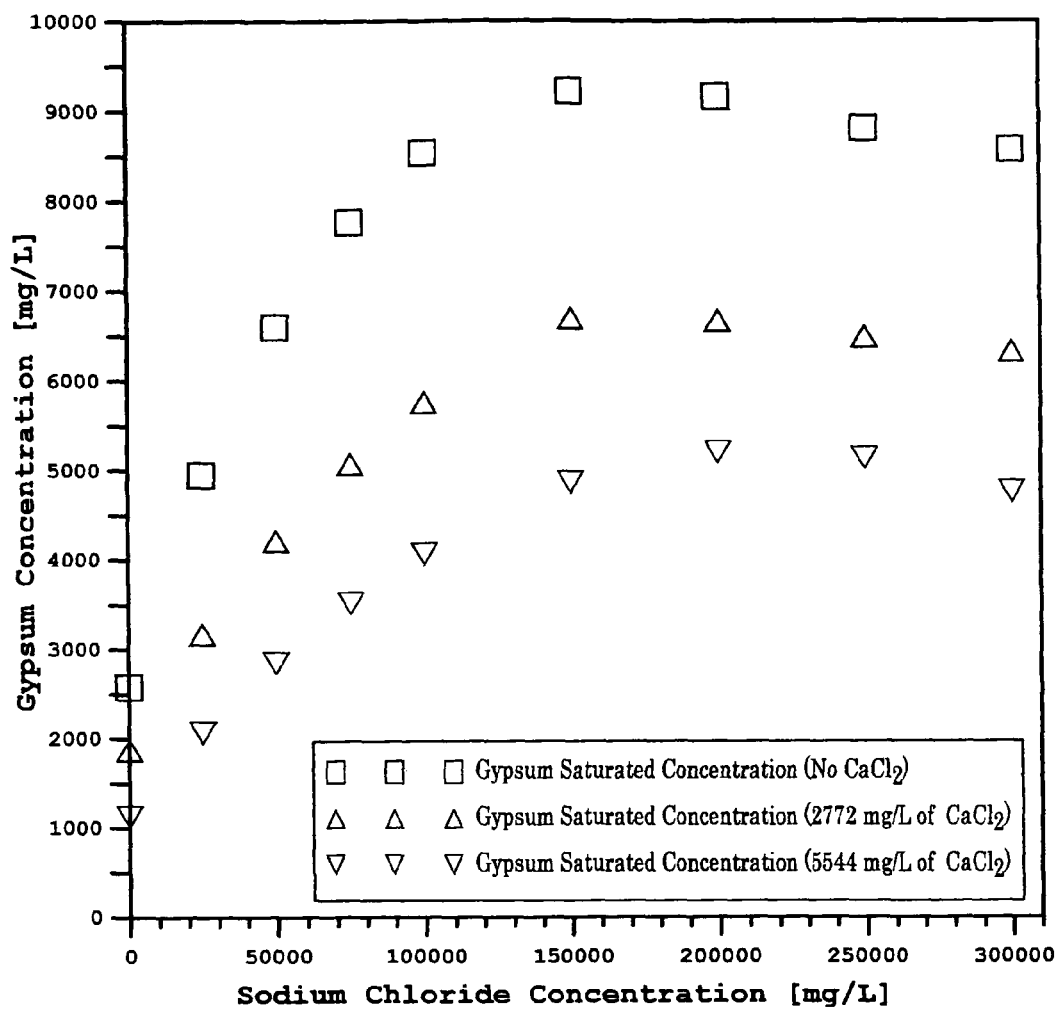
FIG. 6 illustrates the saturation limits of $CaSO_4.2H_2O$ as a function of sodium chloride concentrations without and with the presence of calcium chloride.

FIG. 6 reveals that the solubility limit of $CaSO_4.2H_2O$ is depressed by: (1) 38% upon the addition of 50 meq./L of calcium chloride; and (2) 56% upon the addition of 100 meq./L calcium chloride (due to the common ion effect, calcium). The addition of 50 meq./L of calcium chloride allows the concentration of calcium to slightly exceed the concentration of sulfate in saline streams such as seawater or brine from seawater desalination plants. As such, 5-10% of the total volume of the blended saline stream can be supplied by, for instance, natural brine that is rich with calcium chloride (Table 3) to allow the concentration of calcium in seawater or brine from seawater desalination plants exceeds the concentration of sulfate in such streams.

Figure 7:
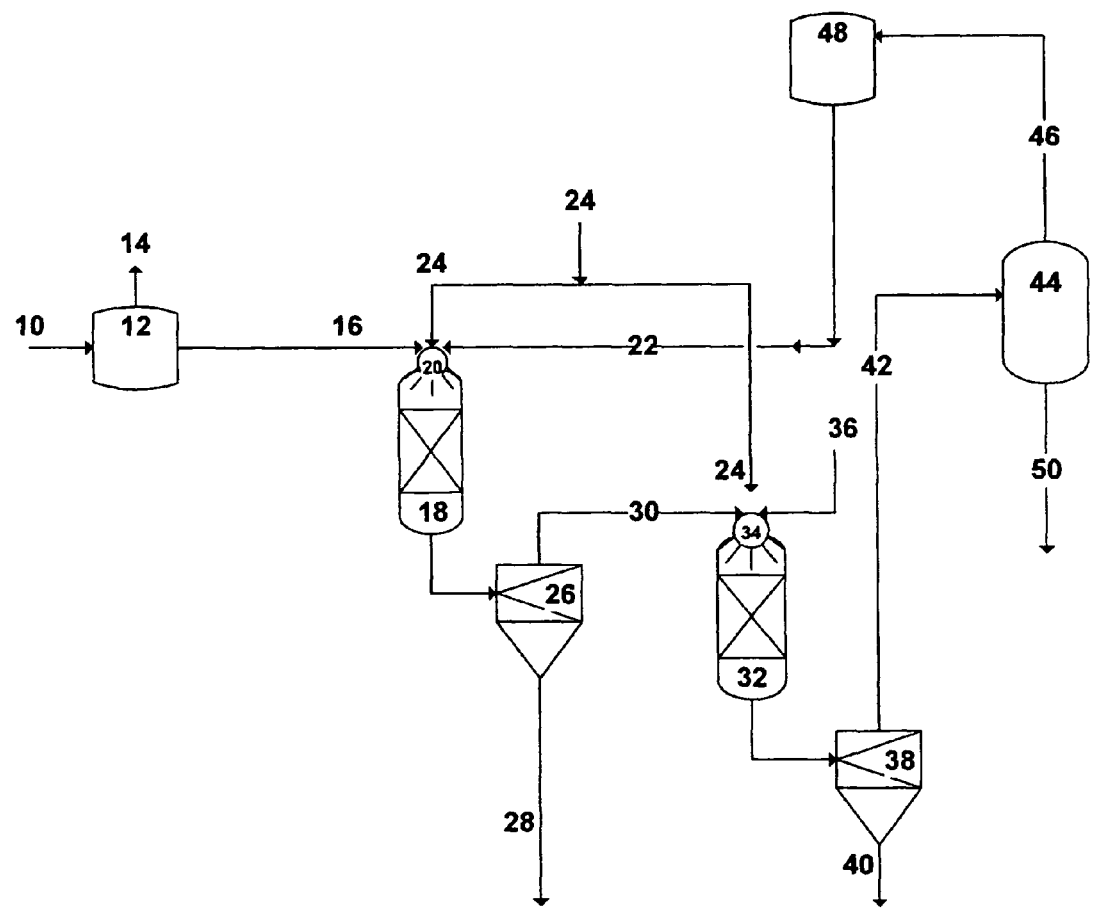
FIG. 7 illustrates a possible flow diagram for the precipitation of $Mg(OH)_2$ and $CaSO_4.2H_2O$ from seawater or brine from seawater desalination plants.

A further alternative is thus shown in FIG. 7, in which the second precipitation stage is conducted for the precipitation of $CaSO_4.2H_2O$ instead of $Ca(OH)_2$ (FIG. 4) or $CaCO_3$ (FIG. 5). The difference in the precipitation of $CaSO_4.2H_2O$ is that the decanted stream [30] from the first primary filtration unit [26] that contains the amine solvent and the nearly magnesium free saline stream will be fed to the second narrow precipitator unit [32] via a pre-mixing nozzle [34]. A sufficient amount of a stream that is rich with calcium chloride such as natural brine or de-oiled produced water will simultaneously be delivered [36] to the second precipitator unit [32] through the same pre-mixing nozzle [34]. A modifier [24] such as $N_2$, $N_2O$ or air will simultaneously be injected to the precipitator unit [32] via the same pre-mixing nozzle [34]. It is worth noting that the presence of the amine solvent in the decanted stream [30] should be sufficient to trigger near complete precipitation of CaSO$_4$.2H$_2$O, and preferably near complete depletion of the sulfate ion. If an excess amount of the amine solvent is needed in the second CaSO$_4$.2H$_2$O precipitation unit [32], then such an amount can be introduced with the modifier [24]. The rest of the processing steps as given in FIG. 7 are identical to the processing steps as described in FIG. 4.

Precipitation of Mg(OH)$_2$ and Calcium Salts (Hydroxide or Carbonate) from Oil-Fields Produced Water Produced water from hydrocarbons production such as oil-fields requires de-oiling. Produced water is also chloride-rich with high concentration of the calcium ion and depleted of the sulfate ion. As such, produced water can also be used for the precipitation of Mg(OH)$_2$ along with, if desirable, the precipitation of the calcium ion in the form of either hydroxide or carbonate.

Figure 8:
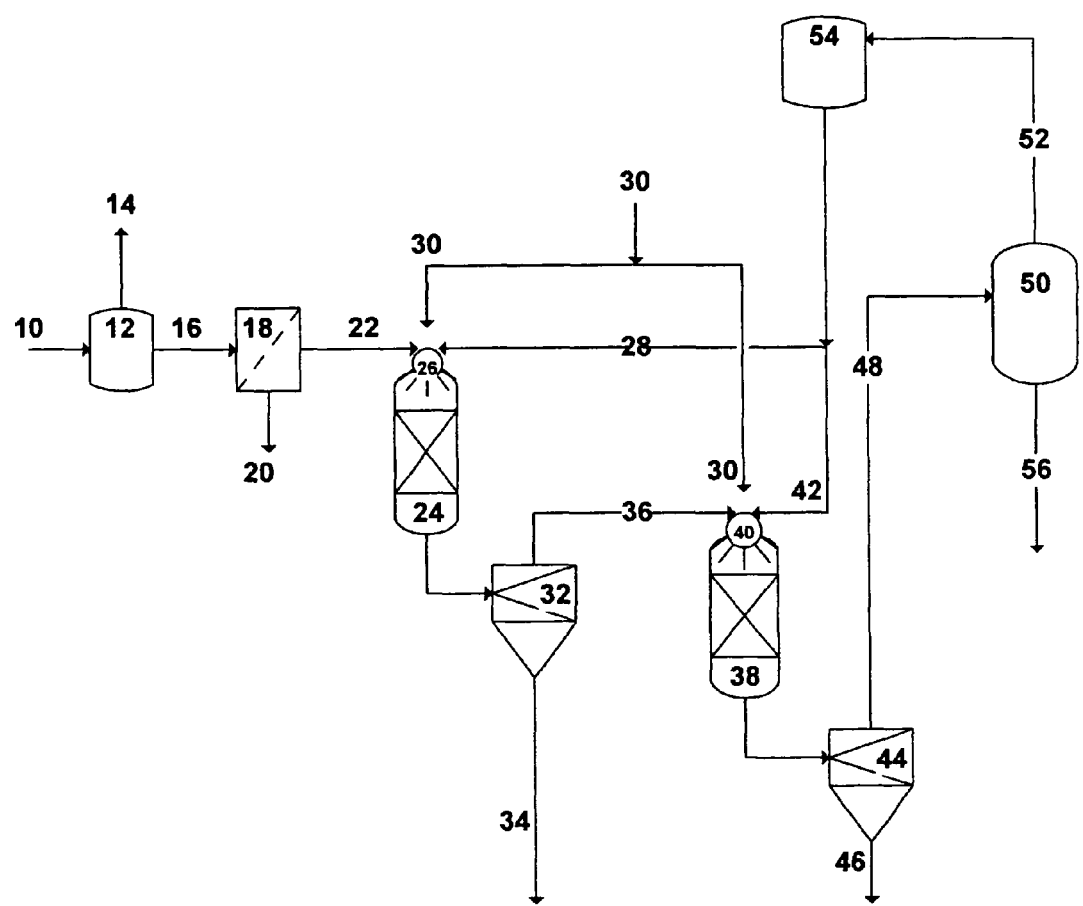
FIG. 8 illustrates a possible flow diagram for the precipitation of $Mg(OH)_2$ and $Ca(OH)_2$ from oil-fields produced water.

FIG. 8 shows the precipitation process in a dual-stage to precipitate Mg(OH)$_2$ and Ca(OH)$_2$. Most oil-fields produced water when received from production facilities are depleted of the associated CO$_2$ but still contain their alkalinity and insufficiently de-oiled. As shown in FIG. 8, oil-fields produced water [10] will be acidified [12] to convert alkalinity to CO$_2$ [14]. The nearly alkaline free produced water [16] will then be de-oiled by a stage of hydrophobic membranes [18]. Such membranes allow oil droplets to pass through while repel water, and thus the oil content [20] will be recovered in a near pure form. The rest of the processing steps [22-56] for the de-oiled produced water as shown in FIG. 8 are identical to the processing steps [10-50] as described in FIG. 4.

Figure 9:
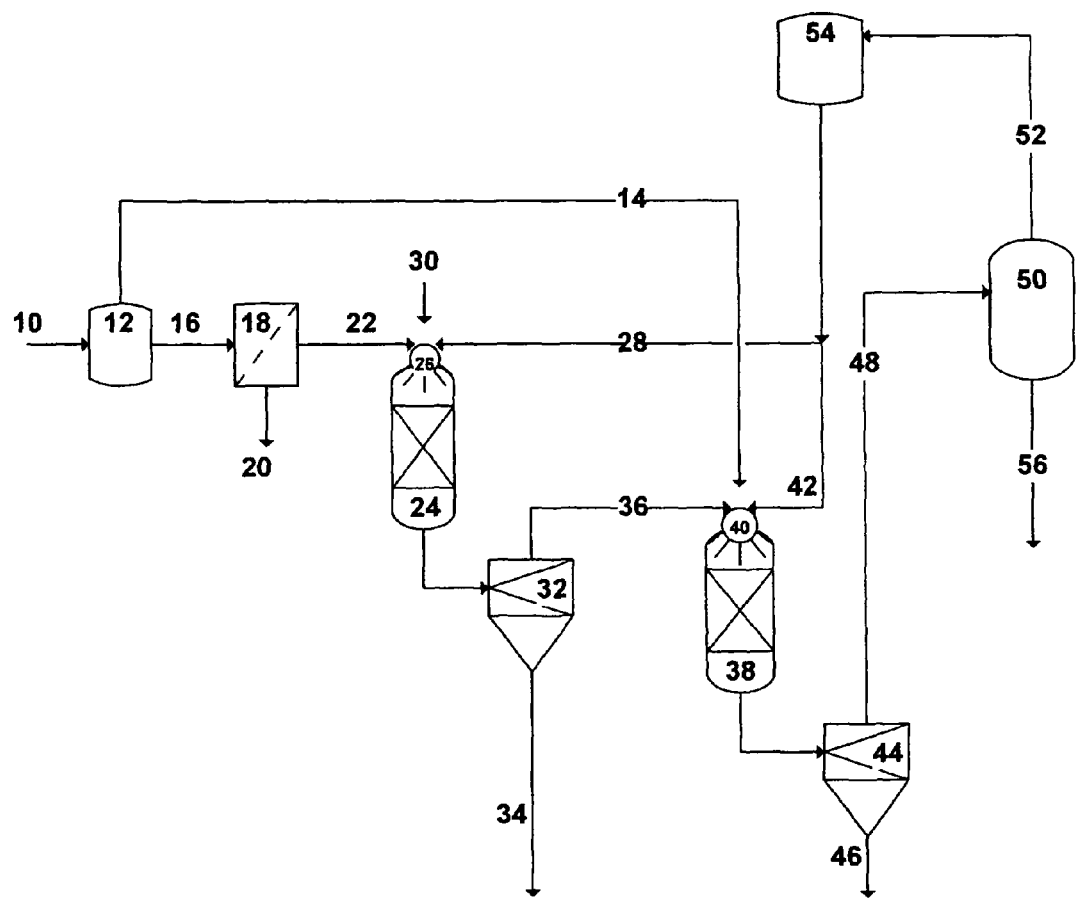
FIG. 9 illustrates a possible flow diagram for the precipitation of $Mg(OH)_2$ and $CaCO_3$ from oil-fields produced water.

If oil-fields produced water is not depleted of its associated CO$_2$ and requires de-oiling, FIG. 9 presents an alternative dual-stage process for the precipitation of Mg(OH)$_2$ and CaCO$_3$. As shown in FIG. 9, oil-fields produced water [10] will be acidified [12] to covert the alkalinity to CO$_2$ and to recover the associated CO$_2$ [14]. The CO$_2$-depleted produced water [16] will then be de-oiled by stage of hydrophobic membranes [18] to recover oil content in a near pure form [20]. The rest of the processing steps [22-56] for the CO$_2$-depleted and de-oiled produced water as shown in FIG. 9 are identical to the processing steps [14-50] as described in FIG. 5.

Absorption of SO$_2$ and Precipitation of Mg(OH)$_2$ and Calcium Salts (Carbonate or Sulfate)

SO$_2$ is an anhydride that needs to be hydrated to become an acid. Unlike other acid gases (e.g., CO$_2$), the aqueous solubility limit of SO$_2$ is about 83,200 mg/L at 25° C. As such, the absorption of SO$_2$ in water is driven by its appreciable aqueous solubility limit as well as its acid-base nature:

$$SO_2+H_2O \Leftrightarrow H_2SO_3 \quad (16)$$

Sulfurous acid (H$_2$SO$_3$) is a weak acid that ionizes in two steps:

$$H_2SO_3 \Leftrightarrow HSO_3+H \text{ (pH: between 2 and 7)} \quad (17)$$

$$HSO_3 \Leftrightarrow SO_3+H \text{ (pH: above 7)} \quad (18)$$

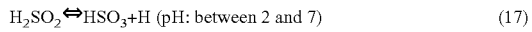

The concentration of SO$_2$ and the amount of water would determine the completion or incompletion of SO$_2$ absorption in water. If a saline stream (e.g., seawater, brine from seawater desalination plants, natural brine, produced water, and the like) is used to absorb SO$_2$, the acidity of the ionized H$_2$SO$_3$ surplus (Eq. 16) breaks the natural alkalinity (the bicarbonate ion) of the saline stream to neutralize the surplus of hydrogen ions, release CO$_2$ (de-carbonation of the saline stream), and increase the pH (the generation of hydrogen sulfite and sulfite ion as weak bases; Eqs. 17 and 18):

$$HCO_3+H \Leftrightarrow H_2O+CO_2 \quad (19)$$

Seawater can be used in standalone wet flue gas desulfurization systems to absorb SO$_2$. However, several drawbacks are associated with such systems. First, they require considerable amounts of seawater to accomplish the near complete absorption of SO$_2$ as well as to increase the pH of spent seawater to near neutral. Second, further considerable amounts of seawater are also required for mixing with spent seawater to insure pH neutrality. Third, the mixed stream (seawater and spent seawater) must also be aerated to complete the oxidation of the absorbed SO$_2$ (as hydrogen sulfite and sulfite ion; Eqs. 17 and 18) into irreversible sulfate ion and to increase the oxygen content (hydrogen sulfite and sulfite ion act as oxygen scavengers).

Such drawbacks, however, can be advantageous if the absorption of SO$_2$ is integrated with seawater desalinations plants since such plants also consume considerable amounts of seawater due to their low productivity. In addition, most of the pre-treatment steps in conventional seawater desalination plants such as acidification (by adding sulfuric acid and the like) to convert the alkalinity of seawater to CO$_2$, the stripping of CO$_2$ from seawater, the addition of oxygen scavengers to deplete oxygen, pH re-adjustment with a caustic solution, and seawater pre-heating before evaporators could entirely be eliminated. Further benefits can also be achieved if the production of Mg(OH)$_2$ along with CaCO$_3$ or CaSO$_4$.2H$_2$O is integrated with seawater desalination plants to operate them in a near complete scale-free (removal of both alkaline and sulfate scale) manner, and thus increase their productivity by at least seven-folds, particularly thermal-driven systems.

Figure 10:
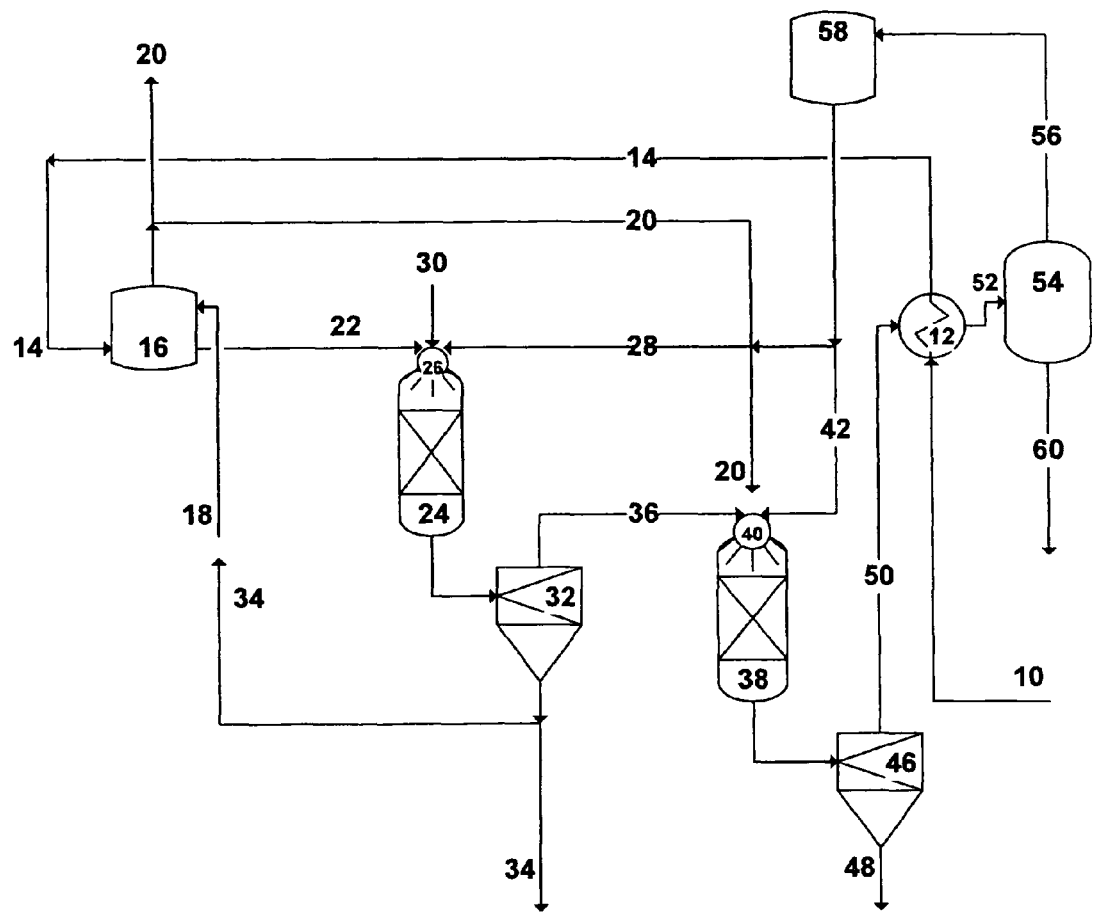
FIG. 10 illustrates a possible flow diagram for the scrubbing of $SO_2$ and the precipitation of $Mg(OH)_2$ and $CaCO_3$ using seawater or brine from seawater desalination plants.

Reference is now made to FIG. 10, which depicts a simplified possible flow diagram for the scrubbing of SO$_2$ and the precipitation of Mg(OH)$_2$ and CaCO$_3$ using seawater. Flue gas [10] from, for instance, power generators fueled by heavy oil will pass through a heat exchanger [12] to reduce its temperature from about 150° C. (422K) to the adiabatic saturation temperature of about 50° C. (325K). Such a lower temperature of the quenched flue gas [14] allows the use of rubber lining as protection against corrosion in the SO$_2$ absorber unit [16]. Seawater [18] will be fed to the SO$_2$ absorber unit [16] to react with the quenched flue gas [14]. The segregated CO$_2$ from the flue gas along with CO$_2$ from the conversion of seawater alkalinity [20] will be vented from the top of SO$_2$ absorber unit [16].

The spent seawater [22] that contains the converted SO$_2$ to HSO$_3$ and SO$_3$ (Eqs. 17 and 18) will be delivered to a narrow precipitator unit [24] preferably via a pre-mixing nozzle [26]. A selected amine solvent will simultaneously be delivered [28] to the precipitator unit [24] through the same pre-mixing nozzle [26]. A modifier [30] for the amine solvent such as N$_2$, N$_2$O or air will simultaneously be injected to the precipitator unit [24] preferably, via the same pre-mixing nozzle [26]. The pressure of the three injected fluids (saline stream, amine solvent and modifier) is between 30 and 1,100 psi. Since seawater in the first precipitation unit is basic due to the injection of the amine solvent (pH>7), the absorbed SO$_2$ in the form of SO$_3$ is readily oxidized to SO$_4$:

$$SO_3+2OH \rightarrow SO_4+H_2O \quad (19)$$

The precipitator outlet stream [24] will be fed to the first primary filtration unit [32], preferably a centrifuge or an ultra-filter, to recover $Mg(OH)_2$ precipitates. Recovered precipitates [34] will pass through a cycle of washing, filtering and drying (not shown).

The decanted stream [36] from the first primary filtration unit [32] that contains nearly magnesium free seawater will be fed to the second narrow precipitator unit [38] via a pre-mixing nozzle [40]. A further amount of the selected amine solvent will simultaneously be delivered [42] to the precipitator unit [38] through the same pre-mixing nozzle [40]. A sufficient portion of the vented $CO_2$ [20] will also simultaneously be injected to the precipitator unit [38] via the same pre-mixing nozzle [40] to allow the near complete precipitation of the calcium ion in the form of carbonate. The pressure of the three injected fluids (saline stream, amine solvent and $CO_2$) is between 30 and 1,100 psi. The outlet stream from the second precipitator unit [38] will be fed to the second primary filtration unit [46], preferably a centrifuge or an ultra-filter, to recover $CaCO_3$ precipitates. The recovered precipitates [48] will pass through a cycle of washing, filtering and drying (not shown).

The decanted stream [50] from the second primary filtration unit [46] that is nearly free of the magnesium and calcium ions will pass through the heat exchanger [12] to increase its temperature [52] and thus allow near complete recovery of the amine solvent in the vapor-liquid equilibrium based stripping unit [54]. The recovered amine solvent [56] will be recycled to the solvent storage tank [58]. Since the decanted seawater [60] is pre-heated via the heat exchanger [12] and nearly free of magnesium and calcium ions, it will thus be readily fed to evaporators of seawater desalination plants to produce high volume of potable water via recycling to the evaporators (recovery of potable water could reach 75% of the seawater feed stream).

Since the productivity of seawater desalination plants could reach 75%, only 25% of seawater feed stream is available for $SO_2$ absorption which might be insufficient for near complete absorption of $SO_2$. If needed, a sufficient portion of the $Mg(OH)_2$ precipitates [34] in a slurry form (before the final cycle of washing, filtering and drying) can thus be blended with seawater [18] before entering the $SO_2$ absorber unit [16] to enhance $SO_2$ absorption.

It should be understood that a portion of the vented $CO_2$ [20] can be used for the re-carbonation of the produced potable water from the evaporators of seawater desalination plants.

It should also be understood that the remaining large portion of the vented $CO_2$ [20] can be used for the enhancement of oil-fields heavy crude oil recovery as a viable supercritical fluid.

It should also be understood that the vented $CO_2$ [20] that is saturated with water and might still contain trace amounts of $SO_2$ must be reheated to above its dew point to minimize corrosion or choosing design conditions and construction materials to withstand the corrosive conditions.

It should also be understood that the heat exchanger [12] can alternatively be used to re-heat the vented $CO_2$ [20] instead of the decanted stream [50] from the second primary filtration unit [46]. Such an arrangement for the heat exchanger might be useful in the case of using pressure-driven (e.g., RO) rather than thermal-driven desalination systems. However, the potable recovery of RO (salinity sensitive) will be lower than the recovery of thermal-driven (salinity insensitive) desalination systems due to osmotic pressure limitation.

It should also be understood that the flue gas feed stream [10] can be split via two heat exchangers; one to heat the decanted stream [50] from the second primary filtration unit [46]; and the second one to re-heat the vented $CO_2$ [20].

Figure 11:
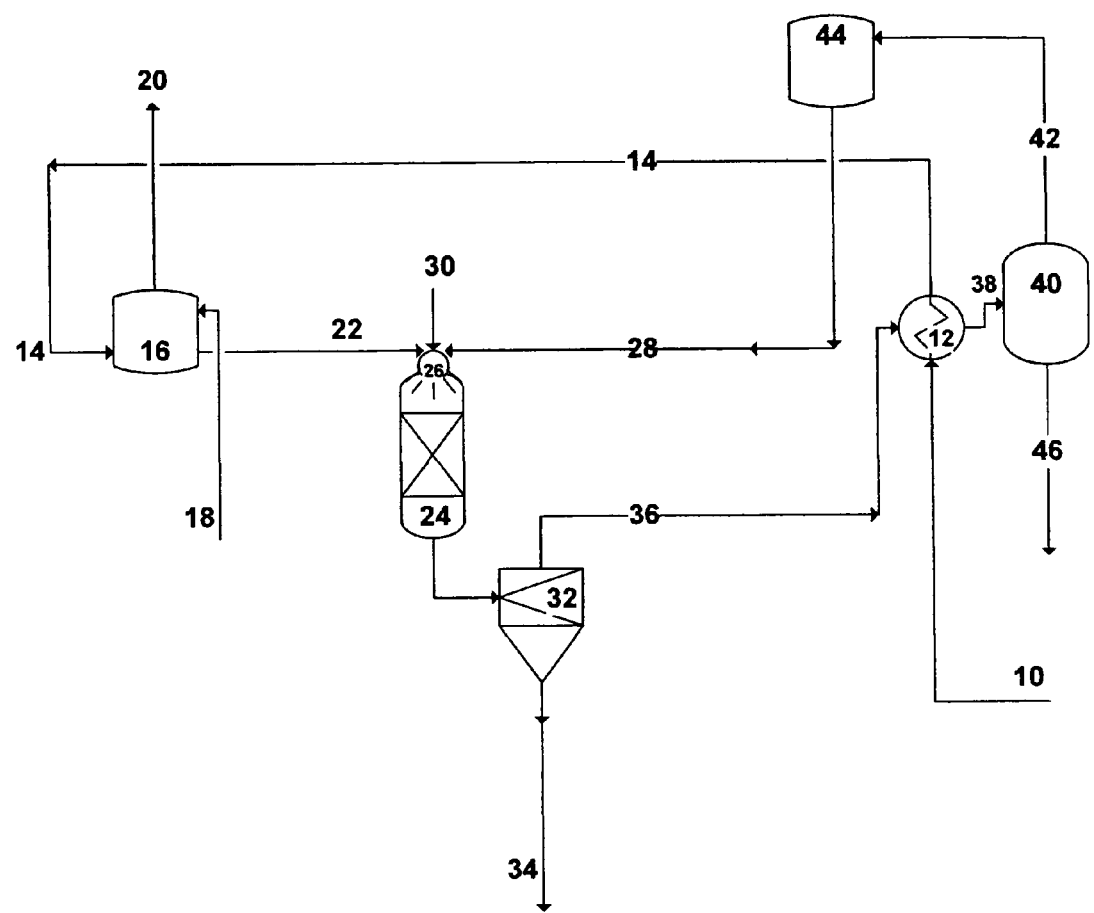
FIG. 11 illustrates a possible flow diagram for the scrubbing of $SO_2$ and the precipitation of $Mg(OH)_2$ in a once-through basis.

It should also be understood that the process as given in FIG. 10 can be truncated to only absorb $SO_2$ and precipitate $Mg(OH)_2$ as shown in FIG. 11.

Figure 12:
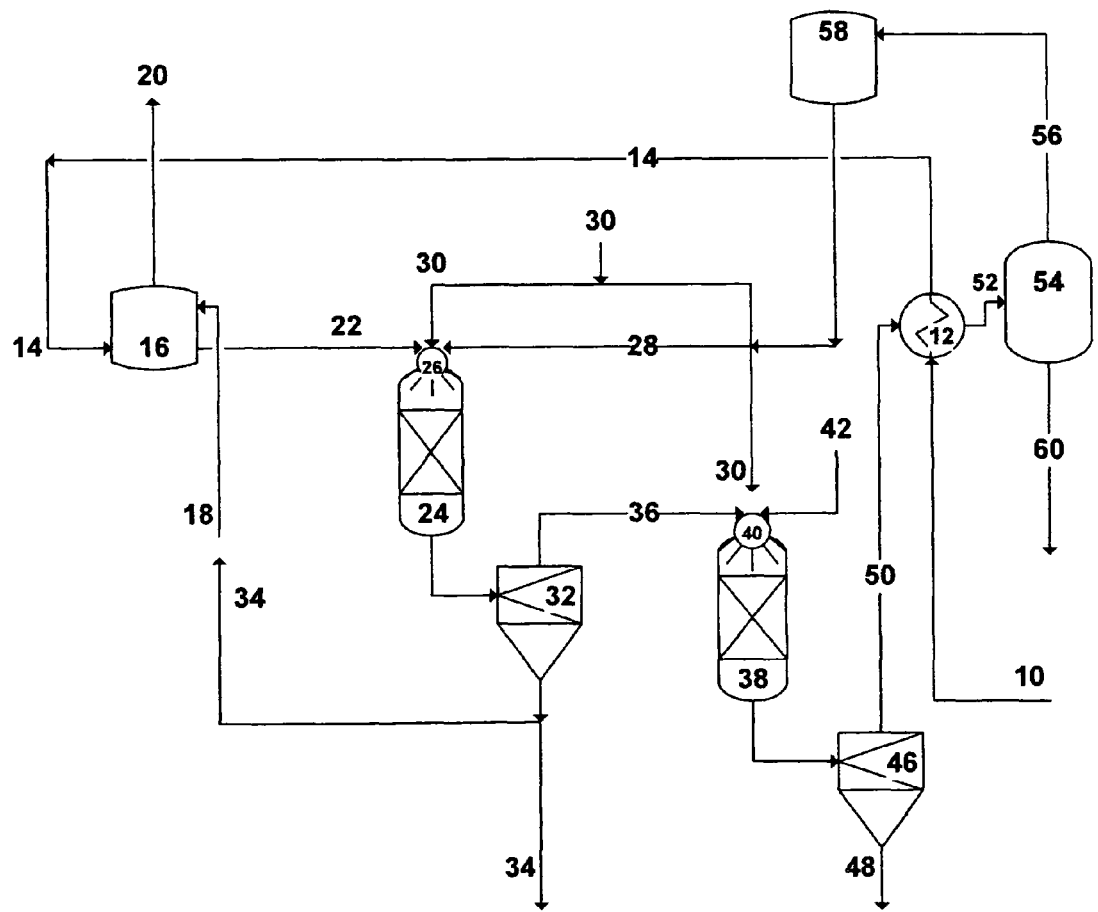
FIG. 12 illustrates a possible flow diagram for the scrubbing of $SO_2$ and the precipitation of $Mg(OH)_2$ and $CaSO_4.2H_2O$ using seawater or brine from seawater desalination plants.

Alternatively, FIG. 12 depicts a simplified possible flow diagram for the scrubbing of $SO_2$ and the precipitation $Mg(OH)_2$ and $CaSO_4.2H_2O$ using seawater or brine from seawater desalination plants. The only different in the processing steps as described in FIG. 10 and the processing steps as given in FIG. 12 is in the precipitation of $CaSO_4.2H_2O$. As shown in FIG. 12, the decanted stream [36] from the first primary filtration unit [32] that contains the amine solvent and the nearly magnesium free saline stream will be fed to the second narrow precipitator unit [38] via a pre-mixing nozzle [40]. A sufficient amount of a stream that is rich with calcium chloride such as natural brine or de-oiled produced water will simultaneously be delivered [42] to the second precipitator unit [38] through the same pre-mixing nozzle [40]. A modifier [30] for the amine solvent such as $N_2$, $N_2O$ or air will simultaneously be injected to the second precipitator unit [38] via the same pre-mixing nozzle [40]. The presence of the amine solvent in the decanted stream [36] should be sufficient to trigger near complete precipitation of $CaSO_4.2H_2O$, and preferably near complete depletion of the sulfate ion. If an excess amount of the amine solvent is needed in the second $CaSO_4.2H_2O$ precipitation unit [38], then such an amount can be introduced with the modifier [30].

Absorption of $SO_2$ in a Closed Loop

Figure 13:
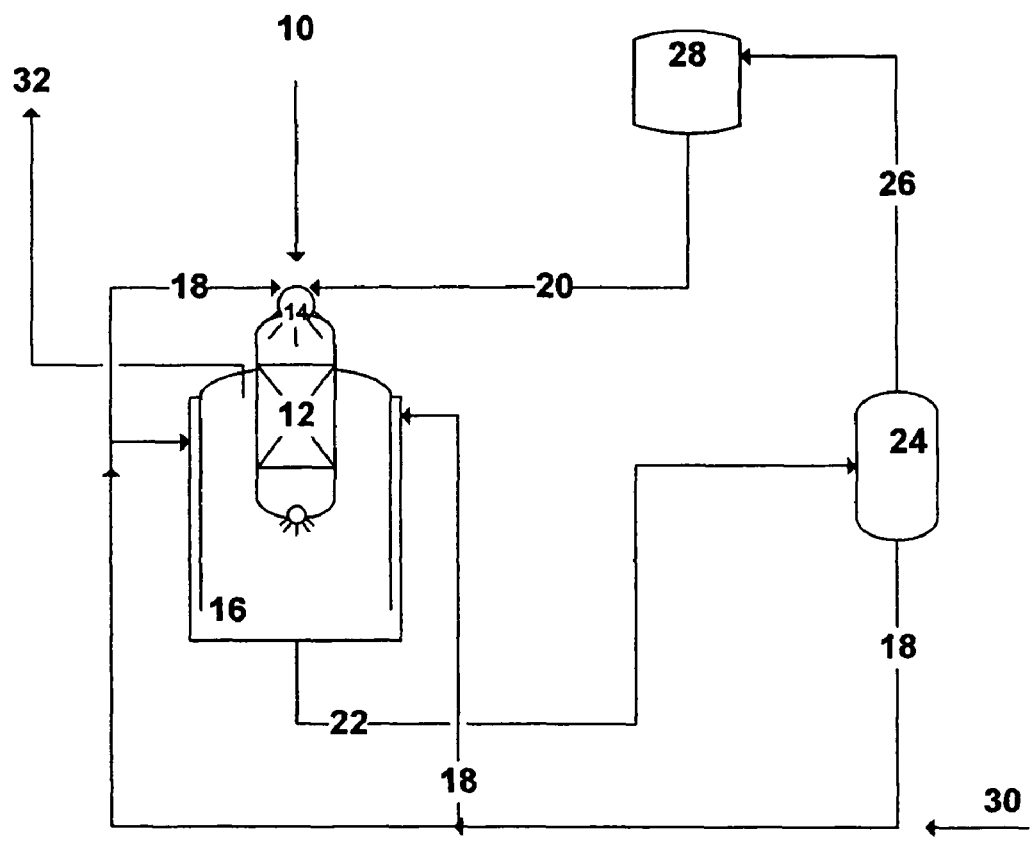
FIG. 13 illustrates a possible flow diagram for the scrubbing of $SO_2$ in a closed-loop using magnesium in saline streams.

Based on Eqs. (3) to (7), the possible absorption of $SO_2$ in a closed loop using the magnesium ion in saline streams (such as seawater, brine from seawater desalination plants, natural brine, de-oiled produced water, and the like) can take place as shown in FIG. 13. Flue gas after pre-oxidation of NO to $NO_2$ [10] will be fed to the precipitator unit [12] at its exhaust's temperature of about 150° C. (422K) and via a pre-mixing nozzle [14]. The precipitator unit [12] will be inserted directly into the flue gas absorber unit [16]. A saline stream [18] along with a selected amine solvent [20] will simultaneously be delivered to the precipitator unit [12] through the same pre-mixing nozzle [14]. The precipitation of $Mg(OH)_2$ and the adsorption of flue gas (Eqs. 3-7) should take place within the precipitator unit [12]. $Mg(OH)_2$ will react rapidly with flue gas to ultimately produce magnesium sulfate as it exists the precipitator unit [12]. The pressure of the three injected fluids (saline stream, amine solvent and flue gas) is between 30 and 1,100 psi. The outlet stream from the precipitator unit [12] will be diffused through the absorber unit [16] where it's mixed with further amounts of the saline stream [18]. If needed, oxidizing air can also be injected at the bottom of the absorber unit [16] (not shown) to ensure the complete conversion of magnesium sulfite and bisulfite to magnesium sulfate. The outlet stream [22] of the absorber unit [16] will be flashed [24] to recover the amine solvent [26] and recycle it to the amine storage tank [28]. Make-up saline water [30] can be added as needed. $CO_2$ [32] will be vented via the top of the absorber unit [16] which will readily be available for applications such as oil-fields enhanced oil recovery. The excess heat within the outlet stream [22] of the absorber unit [16] can also be used to pre-heat the vented $CO_2$ [32] (not shown).

It should be understood that potable water enriched with $Mg(OH)_2$ can be used instead of a saline stream.

It should also be understood that potable water enriched with $Ca(OH)_2$ (Eqs. 8-12) can be used instead of a saline stream. Due to the low aqueous solubility limits of the hydrates of calcium sulfate (compared to magnesium sulfate); however, frequent depletion of the spent potable water and addition of water make-up are required.

Absorption of $SO_2$ and Mineral Sequestration of $CO_2$

Figure 14:
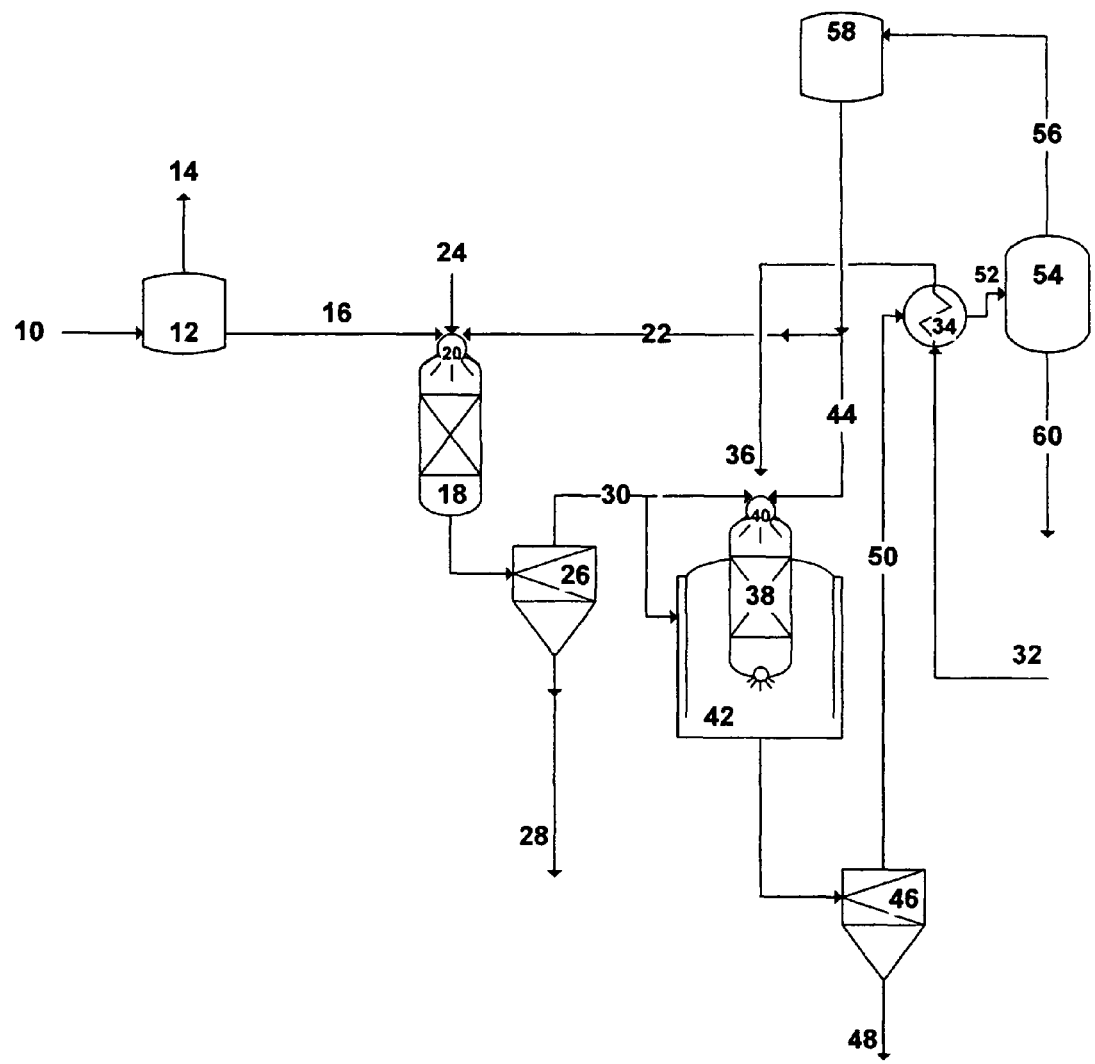
FIG. 14 illustrates a possible flow diagram for the simultaneous scrubbing of $SO_2$ and mineral sequestering of $CO_2$ from flue gas and the precipitation of $Mg(OH)_2$ and $CaCO_3$ using calcium chloride rich formation water.

Saline streams such as natural brine or oil-fields produced water (Table 3) are rich with calcium chloride and depleted of sulfate and therefore they could serve as a potential sink for $CO_2$ mineral sequestering to produce $CaCO_3$. The simultaneous absorption of $SO_2$ and sequestration of $CO_2$ (Eqs. 8-11) from flue gas can be accomplished in one step. However, in order to produce $CaCO_3$ in a near pure form, $Mg(OH)_2$ must be first selectively precipitated from such streams. Reference is now made to FIG. 14, which depicts a simplified possible flow diagram illustrating the precipitation of $Mg(OH)_2$ in the first stage and the simultaneous absorption of $SO_2$ and sequestration of $CO_2$ in the second stage to precipitate $CaCO_3$.

A saline stream (e.g., natural brine, de-oiled oil-fields produced water and the like) [10] will be acidified [12] to convert it's alkalinity to $CO_2$ [14]. The nearly alkaline-free saline stream [16] will then be delivered to the narrow precipitator unit [18] preferably via a pre-mixing nozzle [20]. A selected amine solvent will simultaneously be delivered [22] to the precipitator unit [18] through the same pre-mixing nozzle [20]. A modifier [24] for the amine solvent such as $N_2$, $N_2O$ or air will simultaneously be injected to the precipitator unit [18] preferably via the same pre-mixing nozzle [20]. The pressure of the three injected fluids (saline stream, amine solvent and modifier) is between 30 and 1,100 psi. The outlet stream from the precipitator unit [18] will be fed to the first primary filtration unit [26], preferably a centrifuge or an ultra-filter, to recover $Mg(OH)_2$ precipitates. The recovered precipitates [28] will pass through a cycle of washing, filtering and drying (not shown).

Flue gas (e.g., from flares of crude oil production operations) after pre-oxidation of NO to $NO_2$ [32] will pass through a heat exchanger [34] to reduce its temperature from about 150° C. (422K) to the adiabatic saturation temperature of about 50° C. (325K). Such a lower temperature of the quenched flue gas [32] allows: (1) the conversion of $CO_2$ when reacted $Ca(OH)_2$ to produce $CaCO_3$ (Eq. 8) by preventing it's the thermal breakdown (Eq. 12); and (2) the use of rubber lining as protection against corrosion in the precipitator unit [38]. The quenched flue gas [36] will be fed to the precipitator unit [38] via a pre-mixing nozzle [40]. The precipitator unit [38] will be inserted directly into the flue gas absorber unit [42]. The decanted stream [30] from the first primary filtration unit [26] that contains nearly magnesium free saline stream will be fed to the precipitator unit [38] via the same pre-mixing nozzle [40]. A further amount of the selected amine solvent will simultaneously be delivered [44] to the precipitator unit [38] through the same pre-mixing nozzle [40].

The precipitation of $Ca(OH)_2$ and the adsorption of flue gas (Eqs. 8-11) will simultaneously take place within the precipitator unit [38]. $Ca(OH)_2$ will react rapidly with flue gas to ultimately produce dissolved calcium sulfate and $CaCO_3$ precipitates at the exist of the precipitator unit [38]. The pressure of the three injected fluids (saline stream, amine solvent and flue gas) is between 30 and 1,100 psi. The outlet stream from the precipitator unit [38] will be diffused through the absorber unit [42] where it's mixed with further amounts of the decanted stream [30]. If needed, oxidizing air (not shown) can also be injected at the bottom of the absorber unit [42] to ensure the complete conversion of calcium sulfite and bisulfate to sulfate.

The outlet stream from the absorber unit [42] will be fed to the second primary filtration unit [46], preferably a centrifuge or an ultra-filter, to recover $CaCO_3$ precipitates. The recovered precipitates [48] will pass through a cycle of washing, filtering and drying (not shown).

The decanted stream [50] from the second primary filtration unit [46] will pass through the heat exchanger [34] to increase its temperature [52] and thus allow near complete recovery of the amine solvent in the vapor-liquid equilibrium based stripping unit [54]. The recovered amine solvent [56] will be recycled to the storage tank [58].

The concentration of the generated sulfate ion in the spent saline stream [60] depends on the concentration of $SO_2$ in the absorbed flue gas. However, the not reacted concentration of calcium in the spent saline stream that could pair with sulfate to form the sparingly soluble calcium sulfate depends on the stoichiometric balance between the concentration of $CO_2$ in the flue gas and calcium in the saline stream. If needed, an additional stage for the precipitation of calcium sulfate from the spent saline stream can thus be added. The spent saline can be injected into suitable disposal wells or after de-sulfation (if required) can be used in oil-fields water injection operations.

Figure 15:
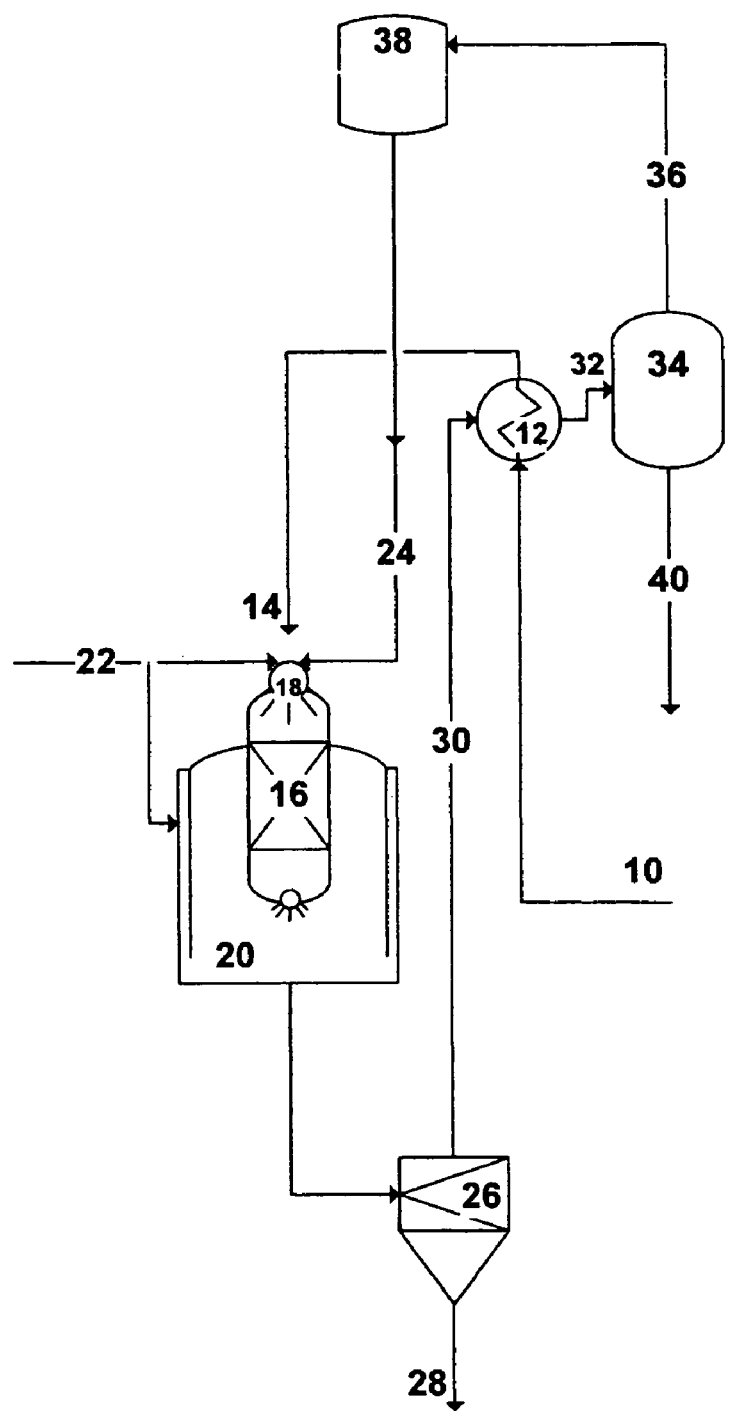
FIG. 15 illustrates a possible flow diagram for the simultaneous scrubbing of $SO_2$ and mineral sequestering of $CO_2$ from flue gas and the precipitation of $CaMg(CO_3)_2$ using calcium chloride rich formation water.

The simultaneous absorption of $SO_2$ and sequestration of $CO_2$ from flue gas as given in Eqs. 3-6 and Eqs. 8-11 could also be accomplished in a single precipitation-absorption stage by simultaneously precipitating $Mg(OH)_2$ and $Ca(OH)_2$ to produce $CaMg(CO_3)$, as shown in FIG. 15. The processing steps [10-40] as given in FIG. 15 are identical to the processing steps [30-60] as described in FIG. 14 except that the precipitates product is $CaMg(CO_3)_2$ instead of $CaCO_3$.

TABLE 1

Average Composition of Heavy Oil Used in Power Plants.

| Species | Wt % |
| --- | --- |
| Carbon | 82-90 |
| Hydrogen | 12-15 |
| Sulfur | 3-8 |

TABLE 2

The Approximate Composition of Flue Gas Produced from the Combustion of Heavy Oil in Power Plants.

| Species | Wt % |
| --- | --- |
| $N_2$ | 74-80 |
| $CO_2$ | 12-14 |
| $H_2O$ | 5-8 |
| $O_2$ | 4-5 |
| $SO_2$ | 0.5-1 |
| NO | 0.05-0.07 |

TABLE 3

Ions Concentrations in Seawater, MSF Brine, Natural Brine, and Oil-Fields Produced Water.

| Ion | SW (mg/L) | MSF-B (mg/L) | NB (mg/L) | PW (mg/L) |
| --- | --- | --- | --- | --- |
| $Na^+$ | 12,170 | 23,240 | 74,770 | 77,680 |
| $K^+$ | 420 | 740 | 3,290 | 2,980 |

TABLE 3-continued

Ions Concentrations in Seawater, MSF Brine, Natural Brine, and Oil-Fields Produced Water.

| Ion | SW (mg/L) | MSF-B (mg/L) | NB (mg/L) | PW (mg/L) |
|---|---|---|---|---|
| $Mg^{+2}$ | 1,530 | 3,000 | 3,490 | 3,850 |
| $Ca^{+2}$ | 540 | 1,750 | 22,570 | 17,610 |
| $Sr^{+2}$ | 7 | | 590 | 351 |
| $Cl^-$ | 24,000 | 40,650 | 168,500 | 159,140 |
| $HCO_3^-$ | 140 | 160 | 250 | 210 |
| $SO_4^{-2}$ | 3,100 | 5,430 | 320 | 360 |
| B | 4.7 | 8 | 25 | 26 |
| pH | 7.7 | 8.7 | 6.6 | 5.6 |

SW: Seawater;
MSF-B: Brine Stream from Multi-Stage Flash Seawater Desalination Systems;
NB: Natural Brine;
PW: Oil-Fields Produced Water.

TABLE 4

Properties of the Selected Pure Fluids.

| Fluid | $T_b$ K | $T_c$ K | $p_c$ atm (psi) | $V_c$ mL/mol | $\omega$ | DP (debye) |
|---|---|---|---|---|---|---|
| $N_2$ | 77.4 | 126.2 | 33.4 (490.8) | 89.9 | 0.039 | 0.0 |
| $N_2O$ | 184.7 | 309.6 | 71.5 (1050.8) | 97.4 | 0.165 | 0.2 |
| $CO_2$ | | 304.1 | 72.8 (1069.9) | 93.9 | 0.239 | 0.0 |
| MA ($CH_5N$) | 266.8 | 430.0 | 74.3 (1091.9) | | 0.292 | 1.3 |
| DMA ($C_2H_7N$) | 280.0 | 437.7 | 53.1 (780.4) | | 0.302 | 1.0 |
| EA ($C_2H_7N$) | 289.7 | 456.4 | 55.7 (818.6) | 182.0 | 0.289 | 1.3 |
| IPA ($C_3H_9N$) | 305.6 | 471.8 | 44.8 (658.4) | 221.0 | 0.291 | 1.2 |
| PA ($C_3H_9N$) | 321.7 | 497.0 | 48.1 (706.9) | 233:0 | 0.303 | 1.3 |
| DEA ($C_4H_{11}N$) | 328.6 | 496.5 | 37.1 (545.2) | 301.0 | 0.291 | 1.1 |
| DIPA ($C_6H_{15}N$) | 357.1 | 523.1 | 30.2 (443.8) | | 0.360 | 1.0 |
| DPA ($C_6H_{15}N$) | 382.5 | 555.8 | 29.9 (439.4) | | 0.471 | 1.0 |
| $H_2O$ | 373.2 | 647.3 | 218.3 (3208.1) | 57.1 | 0.344 | 1.8 |

$T_b$: Normal Boiling Point;
$T_c$: Critical Temperature;
$p_c$: Critical Pressure;
$V_c$: Critical Volume;
$\omega$: Pitzer's Acentric Factor;
DP: Dipole Moment.

What is claimed is:

1. A method for separating magnesium hydroxide from a saline stream or a magnesium-rich aqueous stream, said method comprising the steps of:
   (a) converting the alkalinity of said saline stream to carbon dioxide by adding an acid or by absorbing sulfur dioxide as an acid gas to produce nearly alkalinity-free saline stream;
   (b) removing said magnesium hydroxide from said nearly alkalinity-free saline stream or from said magnesium-rich aqueous stream by
      (i) injecting said nearly alkalinity-free saline stream or said magnesium-rich aqueous stream into a precipitator at a pressure between 30 psi and 1,100 psi through at least one nozzle;
      (ii) injecting an amine solvent into said precipitator at a pressure between 30 psi and the critical pressure of said amine solvent through at least one nozzle to form precipitates comprising said magnesium hydroxide;
      (iii) injecting a modifier for said amine solvent into said precipitator at pressure between 30 psi and 1,100 psi through at least one nozzle;
      (iv) removing said precipitates from said nearly alkalinity-free saline stream or said magnesium-rich aqueous stream by filtering;
      (v) washing, filtering and drying of said precipitates;
   (vi) removing at least most of said amine solvent from said nearly alkalinity-free saline stream or said magnesium-rich aqueous stream by stripping.

2. The method of claim 1 wherein said saline stream is seawater, brine from seawater desalination plants, concentrate saline water from evaporation ponds or solar ponds or salt-gradient solar ponds, natural brine, produced water, spent water from flue gas desulphurization, or a combination thereof.

3. The method of claim 1 wherein said magnesium-rich aqueous stream is an aqueous stream of magnesium chloride, magnesium sulfate, magnesium sulfite, magnesium nitrate, magnesium fluoride, magnesium bromide, magnesium iodide, magnesium bromate, magnesium chlorate, magnesium chlorite, magnesium chromate, or a combination thereof.

4. The method of claim 1 wherein said nozzle is premixed nozzle, coaxial nozzle, spray nozzle, vibrating nozzle, ultrasonic nozzle, or a combination thereof.

5. The method of claim 1 wherein said amine solvent is selected from the group consisting of isopropylamine, propylamine, dipropylamine, diisopropylamine, ethylamine, diethylamine, methylamine, dimethylamine, or a combination thereof.

6. The method of claim 1 wherein said modifier is nitrogen, nitrous oxide, air or a combination thereof.

7. A method for separating magnesium hydroxide and calcium in hydroxide form or carbonate form or sulfate form from a saline stream to produce nearly magnesium-calcium free saline stream and inorganic materials, said method comprising the steps of:
   (a) converting the alkalinity of said saline stream to carbon dioxide by adding an acid to produce nearly alkalinity-free saline stream;
   (b) removing said magnesium hydroxide from said nearly alkalinity-free saline stream by
      (i) injecting said nearly alkalinity-free saline stream into a first precipitator at pressure between 30 psi and 1,100 psi through at least one nozzle:
      (ii) injecting an amine solvent into said first precipitator at pressure between 30 psi and the critical pressure of said amine solvent through at least one nozzle to form precipitates comprising said magnesium hydroxide;
      (iii) injecting a modifier for said amine solvent into said first precipitator at pressure between 30 psi and 1,100 psi through at least one nozzle;
      (iv) removing said precipitates from said nearly alkalinity-free saline stream by filtering to produce slurry of said magnesium hydroxide and magnesium-free saline stream;
      (v) washing, filtering and drying of said slurry of said magnesium hydroxide;
   (c) removing said calcium in said hydroxide form from said magnesium-free saline stream by
      (i) injecting said magnesium-free saline stream into a second precipitator at pressure between 30 psi and 1,100 psi through at least one nozzle;
      (ii) injecting said amine solvent into said second precipitator at pressure between 30 psi and the critical pressure of said amine solvent through at least one nozzle to form precipitates comprising calcium hydroxide from said magnesium-free saline stream;
      (iii) injecting said modifier for said amine solvent into said second precipitator at pressure between 30 psi and 1,100 psi through at least one nozzle;

(iv) removing said precipitates from said magnesium-free saline stream by filtering to produce slurry of said calcium hydroxide and said nearly magnesium-calcium free saline stream;

(v) washing, filtering and drying of said slurry of said calcium hydroxide;

(vi) removing at least most of said amine solvent from said nearly magnesium-calcium free saline stream by stripping; or (d) removing said calcium in said carbonate form from said magnesium-free saline stream by (i) injecting said magnesium-free saline stream into a second precipitator at pressure between 30 psi and 1,100 psi through at least one nozzle;

(ii) injecting said carbon dioxide into said second precipitator at pressure between 30 psi and 1,100 psi through at least one nozzle;

(iii) injecting said amine solvent into said second precipitator at pressure between 30 psi and the critical pressure of said amine solvent through at least one nozzle to form precipitates comprising calcium carbonate from said magnesium-free saline stream;

(iv) removing said precipitates from said magnesium-free saline stream by filtering to produce slurry of said calcium carbonate and said nearly magnesium-calcium free saline stream;

(v) washing, filtering and drying of said slurry of said calcium carbonate;

(vi) removing at least most of said amine solvent from said nearly magnesium-calcium free saline stream by stripping; or (e) removing said calcium in said sulfate form from said magnesium-free saline stream by (i) injecting said magnesium-free saline stream into a second precipitator at pressure between 30 psi and 1,100 psi through at least one nozzle;

(ii) injecting calcium chloride rich formation water into said second precipitator at pressure between 30 psi and 1,100 psi through at least one nozzle to allow the concentration of calcium to exceed the concentration of sulfate in said magnesium-free saline stream and to form precipitates comprising calcium sulfate;

(iii) injecting said modifier or said amine solvent or a mixture of said modifier and said amine solvent into said second precipitator at pressure between 30 psi and 1,100 psi through at least one nozzle to enhance said precipitates of said calcium sulfate from said magnesium-free saline stream;

(iv) removing said precipitates from said magnesium-free saline stream by filtering to produce slurry of said calcium sulfate and said nearly magnesium-calcium free saline stream;

(v) washing, filtering and drying of said slurry of said calcium sulfate;

(vi) removing at least most of said amine solvent from said nearly magnesium-calcium free saline stream by stripping.

8. The method of claim 7 wherein said saline water is seawater, brine from seawater desalination plants, sulfate-rich natural brine, concentrate saline water from evaporation ponds or solar ponds or salt-gradient solar ponds, spent water from flue gas desulphurization, or a combination thereof.

9. The method of claim 7 wherein said calcium chloride rich formation water is natural brine, oil-fields produced water, coal-bed produced water, methane-bed produced water or a combination thereof.

10. The method of claim 7 wherein said nozzle is premixed nozzle, coaxial nozzle, spray nozzle, vibrating nozzle, ultrasonic nozzle, or a combination thereof.

11. The method of claim 7 wherein said amine solvent is selected from the group consisting of isopropylamine, propylamine, dipropylamine, diisopropylamine, ethylamine, diethylamine, methylamine, dimethylamine, or a combination thereof.

12. The method of claim 7 wherein said modifier is nitrogen, nitrous oxide, air or a combination thereof.

13. A method for separating magnesium hydroxide and calcium in hydroxide form or carbonate form from oil-fields produced water to produce nearly magnesium-calcium free produced water and inorganic materials, said method comprising the steps of:

(a) converting the alkalinity of said oil-fields produced water to carbon dioxide by adding an acid to produce nearly alkalinity-free produced water;

(b) separating oil droplets from said nearly alkalinity-free produced water by hydrophobic membranes to produce de-oiled produced water, (c) removing said magnesium hydroxide from said de-oiled produced water by (i) injecting said de-oiled produced water into a first precipitator at pressure between 30 psi and 1,100 psi through at least one nozzle;

(ii) injecting an amine solvent into said first precipitator at pressure between 30 psi and the critical pressure of said amine solvent through at least one nozzle to form precipitates comprising said magnesium hydroxide;

(iii) injecting a modifier for said amine solvent into said first precipitator at pressure between 30 psi and 1,100 psi through at least one nozzle;

(iv) removing said precipitates from said de-oiled produced water by filtering to produce slurry of said magnesium hydroxide and magnesium-free produced water;

(v) washing, filtering and drying of said slurry of said magnesium hydroxide;

(d) removing said calcium in said hydroxide form from said magnesium-free produced water by (i) injecting said magnesium-free produced water into a second precipitator at pressure between 30 psi and 1,100 psi through at least one nozzle;

(ii) injecting said amine solvent into said second precipitator at pressure between 30 psi and the critical pressure of said amine solvent through at least one nozzle to form precipitates comprising calcium hydroxide from said magnesium-free produced water;

(iii) injecting said modifier for said amine solvent into said second precipitator at pressure between 30 psi and 1,100 psi through at least one nozzle;

(iv) removing said precipitates from said magnesium-free produced water by filtering to produce slurry of said calcium hydroxide and said nearly magnesium-calcium free produced water;

(v) washing, filtering and drying of said slurry of said calcium hydroxide;

(vi) removing at least most of said amine solvent from said nearly magnesium-calcium free produced water by stripping; or (e) removing said calcium in said carbonate form from said magnesium-free produced water by (i) injecting said magnesium-free produced water into a second precipitator at pressure between 30 psi and 1,100 psi through at least one nozzle;

(ii) injecting carbon dioxide into said second precipitator at pressure between 30 psi and 1,100 psi through at least one nozzle;

(iii) injecting said amine solvent into said second precipitator at pressure between 30 psi and the critical pressure of said amine solvent through at least one nozzle to form precipitates comprising calcium carbonate from said magnesium-free produced water;

(iv) removing said precipitates from said magnesium-free produced water by filtering to produce slurry of said calcium carbonate and said nearly magnesium-calcium free produced water;

(v) washing, filtering and drying of said slurry of said calcium carbonate;

(vi) removing at least most of said amine solvent from said nearly magnesium-calcium free produced water by stripping.

14. The method of claim 13 wherein said nozzle is premixed nozzle, coaxial nozzle, spray nozzle, vibrating nozzle, ultrasonic nozzle, or a combination thereof.

15. The method of claim 13 wherein said amine solvent is selected from the group consisting of isopropylamine, propylamine, dipropylamine, diisopropylamine, ethylamine, diethylamine, methylamine, dimethylamine, or a combination thereof.

16. The method of claim 13 wherein said modifier is nitrogen, nitrous oxide, air or a combination thereof.

17. A method for scrubbing sulfur dioxide from flue gas and separating magnesium hydroxide and calcium in carbonate form or sulfate form from a saline stream to produce nearly magnesium-calcium free saline stream and inorganic materials, said method comprising the steps of:

(a) reacting said flue gas with said saline stream to absorb and convert said sulfur dioxide to sulfite, liberate carbon dioxide in a near pure form, and produce nearly alkalinity-free saline stream;

(b) removing said magnesium hydroxide from said nearly alkalinity-free saline stream by
  (i) injecting said nearly alkalinity-free saline stream into a first precipitator at pressure between 30 psi and 1,100 psi through at least one nozzle;
  (ii) injecting an amine solvent into said first precipitator at pressure between 30 psi and the critical pressure of said amine solvent through at least one nozzle to form precipitates comprising said magnesium hydroxide;
  (iii) injecting a modifier for said amine solvent into said first precipitator at pressure between 30 psi and 1,100 psi through at least one nozzle;
  (iv) removing said precipitates from said nearly alkalinity-free saline stream by filtering to produce slurry of said magnesium hydroxide and magnesium-free saline stream;
  (v) washing, filtering and drying of said slurry of said magnesium hydroxide;

(c) removing said calcium in said carbonate form from said magnesium-free saline stream by
  (i) injecting said magnesium-free saline stream into a second precipitator at pressure between 30 psi and 1,100 psi through at least one nozzle;
  (ii) injecting a portion of said carbon dioxide into said second precipitator at pressure between 30 psi and 1,100 psi through at least one nozzle;
  (iii) injecting said amine solvent into said second precipitator at pressure between 30 psi and the critical pressure of said amine solvent through at least one nozzle to form precipitates comprising calcium carbonate from said magnesium-free saline stream;
  (iv) removing said precipitates from said magnesium-free saline stream by filtering to produce slurry of said calcium carbonate and said nearly magnesium-calcium free saline stream;
  (v) washing, filtering and drying of said slurry of said calcium carbonate;
  (vi) removing at least most of said amine solvent from said nearly magnesium-calcium free saline stream by stripping; or (d) removing said calcium in said sulfate form from said magnesium-free saline stream by
  (i) injecting said magnesium-free saline stream into a second precipitator at pressure between 30 psi and 1,100 psi through at least one nozzle;
  (ii) injecting calcium chloride rich formation water into said second precipitator at pressure between 30 psi and 1,100 psi through at least one nozzle to allow the concentration of calcium to exceed the concentration of sulfate in said magnesium-free saline stream and to form precipitates comprising calcium sulfate;
  (iii) injecting said modifier or said amine solvent or a mixture of said modifier and said amine solvent into said second precipitator at pressure between 30 psi and 1,100 psi through at least one nozzle to enhance said precipitates of said calcium sulfate from said magnesium-free saline stream;
  (iv) removing said precipitates from said magnesium-free saline stream by filtering to produce slurry of said calcium sulfate and said nearly magnesium-calcium free saline stream;
  (v) washing, filtering and drying of said slurry of said calcium sulfate;
  (vi) removing at least most of said amine solvent from said nearly magnesium-calcium free saline stream by stripping.

18. The method of claim 17 wherein said saline water is seawater, brine from seawater desalination plants, concentrate saline water from evaporation ponds or solar ponds or salt-gradient solar ponds, sulfate-rich natural brine, spent water from flue gas desulphurization, or a combination thereof.

19. The method of claim 17 wherein said calcium chloride rich formation water is natural brine, oil-fields produced water, coal-bed produced water, methane-bed produced water or a combination thereof.

20. The method of claim 17 wherein said nozzle is premixed nozzle, coaxial nozzle, spray nozzle, vibrating nozzle, ultrasonic nozzle, or a combination thereof.

21. The method of claim 17 wherein said amine solvent is selected from the group consisting of isopropylamine, propylamine, dipropylamine, diisopropylamine, ethylamine, diethylamine, methylamine, dimethylamine, or a combination thereof.

22. The method of claim 17 wherein said modifier is nitrogen, nitrous oxide, air or a combination thereof.

23. A method for scrubbing sulfur dioxide from flue gas using a saline stream or a magnesium-rich aqueous stream, said method comprising the steps of:

(a) injecting said saline stream or said magnesium-rich aqueous stream into a precipitator at a pressure between 30 psi and 1,100 psi through at least one nozzle;

(b) injecting an amine solvent into said precipitator at a pressure between 30 psi and the critical pressure of said amine solvent through at least one nozzle to form precipitates comprising magnesium hydroxide;

(c) injecting said flue gas into said precipitator at pressure between 30 psi and 1,100 psi through at least one nozzle to react said sulfur dioxide with said precipitates of said magnesium hydroxide to produce magnesium sulfite and magnesium sulfate;
(d) oxidizing said magnesium sulfite to produce said magnesium sulfate;
(e) liberating carbon dioxide in a near pure form from said flue gas;
(f) removing at least most of said amine solvent from said saline stream or said magnesium-rich aqueous stream by stripping;
(g) recycling said saline stream or said magnesium-rich aqueous stream and said amine solvent to said precipitator.

24. The method of claim 23 wherein said saline stream is seawater, brine from seawater desalination plants, concentrate saline water from evaporation ponds or solar ponds or salt-gradient solar ponds, natural brine, produced water, spent water from flue gas desulphurization, or a combination thereof.

25. The method of claim 23 wherein said magnesium-rich aqueous stream is an aqueous stream of magnesium chloride, magnesium sulfate, magnesium sulfite, magnesium nitrate, magnesium fluoride, magnesium bromide, magnesium iodide, magnesium bromate, magnesium chlorate, magnesium chlorite, magnesium chromate, or a combination thereof.

26. The method of claim 23 wherein said nozzle is pre-mixed nozzle, coaxial nozzle, spray nozzle, vibrating nozzle, ultrasonic nozzle, or a combination thereof.

27. The method of claim 23 wherein said amine solvent is selected from the group consisting of isopropylamine, propylamine, dipropylamine, diisopropylamine, ethylamine, diethylamine, methylamine, dimethylamine, or a combination thereof.

28. A method for separating magnesium hydroxide and scrubbing flue gas using calcium chloride rich formation water to produce calcium carbonate and magnesium-calcium free formation water, said method comprising the steps of:
(a) converting the alkalinity of said calcium chloride rich formation water to carbon dioxide by adding an acid to produce nearly alkalinity-free calcium chloride rich formation water;
(b) removing said magnesium hydroxide from said nearly alkalinity-free calcium chloride rich formation water by
  (i) injecting said nearly alkalinity-free calcium chloride rich formation water into a first precipitator at pressure between 30 psi and 1,100 psi through at least one nozzle;
  (ii) injecting an amine solvent into said first precipitator at pressure between 30 psi and the critical pressure of said amine solvent through at least one nozzle to form precipitates comprising said magnesium hydroxide;
  (iii) injecting a modifier for said amine solvent into said first precipitator at pressure between 30 psi and 1,100 psi through at least one nozzle;
  (iv) removing said precipitates from said nearly alkalinity-free calcium chloride rich formation water by filtering to produce slurry of said magnesium hydroxide and magnesium-free calcium chloride rich formation water;
  (v) washing, filtering and drying of said slurry of said magnesium hydroxide;
(c) reacting said flue gas with said magnesium-free calcium chloride rich formation water to produce calcium carbonate by
  (i) injecting said magnesium-free calcium chloride rich formation water into a second precipitator at a pressure between 30 psi and 1,100 psi through at least one nozzle;
  (ii) injecting an amine solvent into said second precipitator at a pressure between 30 psi and the critical pressure of said amine solvent through at least one nozzle to form precipitates comprising calcium hydroxide;
  (iii) injecting said flue gas into said second precipitator at pressure between 30 psi and 1,100 psi through at least one nozzle to react said flue gas with said precipitates of said calcium hydroxide to produce calcium sulfite, calcium sulfate, and precipitates comprising calcium carbonate;
  (iv) oxidizing said calcium sulfite to produce said calcium sulfate;
  (v) removing said precipitates from said magnesium-free calcium chloride rich formation water by filtering to produce slurry of said calcium carbonate and said nearly magnesium-calcium free formation water;
  (vi) washing, filtering and drying of said slurry of said calcium carbonate;
  (vii) removing at least most of said amine solvent from said nearly magnesium-calcium free formation water by stripping.

29. The method of claim 28 wherein said calcium chloride rich formation water is natural brine, oil-fields produced water, coal-bed produced water, methane-bed produced water or a combination thereof.

30. The method of claim 28 wherein said nozzle is pre-mixed nozzle, coaxial nozzle, spray nozzle, vibrating nozzle, ultrasonic nozzle, or a combination thereof.

31. The method of claim 28 wherein said amine solvent is selected from the group consisting of isopropylamine, propylamine, dipropylamine, diisopropylamine, ethylamine, diethylamine, methylamine, dimethylamine, or a combination thereof.

32. The method of claim 28 wherein said modifier is nitrogen, nitrous oxide, air or a combination thereof.

33. A method for scrubbing flue gas using calcium chloride rich formation water to produce dolomite and nearly magnesium-calcium free formation water, said method comprising the steps of:
(a) injecting said calcium chloride rich formation water into a precipitator at a pressure between 30 psi and 1,100 psi through at least one nozzle;
(b) injecting an amine solvent into said precipitator at a pressure between 30 psi and the critical pressure of said amine solvent through at least one nozzle to form precipitates comprising magnesium hydroxide and calcium hydroxide;
(c) injecting said flue gas into said precipitator at pressure between 30 psi and 1,100 psi through at least one nozzle to react said flue gas with said precipitates of said magnesium hydroxide and said calcium hydroxide to produce magnesium sulfite, magnesium sulfate, calcium sulfite, calcium sulfate and precipitates comprising dolomite;
(d) oxidizing said magnesium sulfite and said calcium sulfite to produce said magnesium sulfate and said calcium sulfate;
(e) removing said precipitates from said calcium chloride rich formation water by filtering to produce slurry of said dolomite and said nearly magnesium-calcium free formation water;

(f) washing, filtering and drying of said slurry of said dolomite;

(g) removing at least most of said amine solvent from said nearly magnesium-calcium free formation water by stripping.

34. The method of claim 33 wherein said calcium chloride rich formation water is natural brine, oil-fields produced water, coal-bed produced water, methane-bed produced water or a combination thereof.

35. The method of claim 33 wherein said nozzle is premixed nozzle, coaxial nozzle, spray nozzle, vibrating nozzle, ultrasonic nozzle, or a combination thereof.

36. The method of claim 33 wherein said amine solvent is selected from the group consisting of isopropylamine, propylamine, dipropylamine, diisopropylamine, ethylamine, diethylamine, methylamine, dimethylamine, or a combination thereof.

* * * * *